US012104361B2

(12) United States Patent
Clarke et al.

(10) Patent No.: US 12,104,361 B2
(45) Date of Patent: Oct. 1, 2024

(54) SYSTEM AND PROCESS FOR CONDUCTING IN-FIELD OPERATIONS

(71) Applicant: ESCO GROUP LLC, Portland, OR (US)

(72) Inventors: Rodney K. Clarke, Cleveland (AU); Christopher M. Carpenter, Tualatin, OR (US); Noah D. Cowgill, Portland, OR (US); David M. Paul, Corbett, OR (US); Hakan Gurocak, Vancouver, WA (US); Scott R. Burgett, Tacoma, WA (US)

(73) Assignee: ESCO GROUP LLC, Portland, OR (US)

( * ) Notice: Subject to any disclaimer, the term of this patent is extended or adjusted under 35 U.S.C. 154(b) by 787 days.

(21) Appl. No.: 16/708,372

(22) Filed: Dec. 9, 2019

(65) Prior Publication Data

US 2020/0263396 A1    Aug. 20, 2020

Related U.S. Application Data

(60) Provisional application No. 62/777,656, filed on Dec. 10, 2018.

(51) Int. Cl.
| E02F 9/28 | (2006.01) |
| B25J 11/00 | (2006.01) |
| B25J 17/02 | (2006.01) |
| E02F 9/22 | (2006.01) |

(52) U.S. Cl.
CPC .......... *E02F 9/2891* (2013.01); *B25J 17/0208* (2013.01); *B25J 11/00* (2013.01); *E02F 9/2203* (2013.01)

(58) Field of Classification Search
CPC ...... E02F 9/2891; E02F 9/264; A01G 23/091; B25J 15/0066
See application file for complete search history.

(56) References Cited

U.S. PATENT DOCUMENTS

| 2,546,037 A | 6/1947 | Freiheit |
| 2,807,105 A | 9/1957 | Launder |
| 3,927,778 A * | 12/1975 | Zrostlik ................ B66C 1/447 |
| | | 294/86.41 |
| 4,459,898 A | 7/1984 | Harjar et al. |
| 4,791,738 A | 12/1988 | Briscoe |
| 4,932,145 A | 6/1990 | Reeves, Jr. |

(Continued)

FOREIGN PATENT DOCUMENTS

| AU | 20130304355 | 12/2016 |
| CL | 200502650 | 6/2007 |

(Continued)

OTHER PUBLICATIONS

Zhang et al., The Challenges of Integrating an Industrial Robot on a Mobile Platform, IEEE Int'l Conf. on Automation & Logistics, Hong Kong and Macau, Aug. 16-20, 2010.

*Primary Examiner* — Michael W Hotchkiss
(74) *Attorney, Agent, or Firm* — Steven Schad; Palmer Dzurella

(57) ABSTRACT

A handling apparatus for conducting in-field operations such as removing and/or installing wear parts on earth working equipment along a controlled path. The apparatus can include a crane, a joint having three axes of articulation and a tool.

16 Claims, 17 Drawing Sheets

(56) References Cited

U.S. PATENT DOCUMENTS

| | | |
|---|---|---|
| 5,022,812 A | 6/1991 | Coughlan et al. |
| 5,104,024 A | 4/1992 | Brewer et al. |
| 5,210,919 A | 5/1993 | Garman |
| 5,259,721 A | 11/1993 | Sato et al. |
| 5,305,653 A * | 4/1994 | Ohtani ................. B25J 17/0283 |
| | | 901/29 |
| 5,409,415 A | 4/1995 | Kawanami et al. |
| 5,410,478 A | 4/1995 | Richard et al. |
| 5,531,337 A | 7/1996 | Cappelletti et al. |
| 5,555,504 A | 9/1996 | Lepper et al. |
| 5,584,646 A | 12/1996 | Lewis et al. |
| 5,672,044 A | 9/1997 | Lemelson |
| 5,680,694 A | 10/1997 | Best |
| 5,937,551 A | 8/1999 | Moehnke et al. |
| 6,029,934 A | 2/2000 | Foster |
| 6,045,092 A | 4/2000 | Foster |
| 6,047,926 A | 4/2000 | Stanko et al. |
| 6,370,801 B1 | 4/2002 | Weyer et al. |
| 6,405,633 B1 * | 6/2002 | Dueckinghaus ...... F15B 11/028 |
| | | 91/451 |
| 6,408,906 B1 * | 6/2002 | Moon .................. A01G 23/091 |
| | | 144/34.1 |
| 6,477,730 B1 | 11/2002 | Marrero |
| 6,671,582 B1 | 12/2003 | Hanley |
| 6,990,390 B2 | 1/2006 | Groth et al. |
| 7,311,489 B2 | 12/2007 | Ekman |
| 7,600,460 B2 | 10/2009 | Manders |
| 7,877,906 B2 | 2/2011 | Ramun |
| 8,381,501 B2 | 2/2013 | Koselka et al. |
| 8,413,747 B2 | 4/2013 | Beard et al. |
| 8,583,313 B2 | 11/2013 | Mian |
| 8,768,579 B2 | 7/2014 | Taylor et al. |
| 8,872,643 B2 | 10/2014 | Ebert |
| 9,194,666 B2 | 11/2015 | Dennis et al. |
| 9,248,701 B2 * | 2/2016 | Calvi ..................... B60B 29/00 |
| 9,393,686 B1 | 7/2016 | Bradski et al. |
| 9,429,016 B2 | 8/2016 | Derycke et al. |
| 9,488,449 B2 * | 11/2016 | Opperman ........... B25J 11/0025 |
| 9,700,974 B2 * | 7/2017 | Komatsu ................ B23P 21/00 |
| 9,789,603 B2 * | 10/2017 | Jacobsen .................. B66F 9/12 |
| 9,840,886 B1 * | 12/2017 | Gable ..................... B63C 11/52 |
| 10,273,661 B2 | 4/2019 | Shahroudi et al. |
| 10,364,554 B2 | 7/2019 | Cheyne et al. |
| 10,988,916 B2 | 4/2021 | Paul et al. |
| 11,015,324 B2 * | 5/2021 | Clarke .................. E02F 9/2833 |
| 11,247,737 B2 * | 2/2022 | Summer ............... B25J 13/089 |
| 2002/0194754 A1 | 12/2002 | Brown |
| 2003/0221338 A1 | 12/2003 | Verseef |
| 2007/0044349 A1 | 3/2007 | McClanahan et al. |
| 2008/0008546 A1 * | 1/2008 | Dietens ................. E02F 9/2891 |
| | | 901/2 |
| 2008/0041467 A1 * | 2/2008 | Stretch ..................... F01L 9/10 |
| | | 251/129.1 |
| 2008/0047170 A1 | 2/2008 | Nichols |
| 2009/0035107 A1 | 2/2009 | Duran et al. |
| 2009/0038186 A1 | 2/2009 | Osswald et al. |
| 2009/0121061 A1 | 5/2009 | Salamanca |
| 2009/0155032 A1 | 6/2009 | Hedley et al. |
| 2009/0177324 A1 | 7/2009 | Salamanca |
| 2009/0223355 A1 | 9/2009 | Manders |
| 2010/0042357 A1 * | 2/2010 | McCoy, Jr. ............ B25J 9/1694 |
| | | 702/141 |
| 2010/0057254 A1 * | 3/2010 | Salamanca ............... B25J 11/00 |
| | | 414/730 |
| 2010/0068024 A1 * | 3/2010 | Agens ..................... B25J 15/04 |
| | | 901/30 |
| 2010/0095799 A1 | 4/2010 | Albin et al. |
| 2010/0096148 A1 * | 4/2010 | Chiorean ................ E02F 9/265 |
| | | 172/430 |
| 2010/0164243 A1 * | 7/2010 | Albin ...................... B66F 9/065 |
| | | 74/425 |
| 2010/0179691 A1 | 7/2010 | Gal et al. |
| 2011/0030248 A1 | 2/2011 | Clendenning et al. |
| 2011/0131843 A1 | 6/2011 | Carpenter |
| 2011/0197416 A1 * | 8/2011 | Hedley .................. B60B 30/00 |
| | | 414/469 |
| 2012/0102703 A1 * | 5/2012 | Salamanca ............... B25J 11/00 |
| | | 901/31 |
| 2012/0153652 A1 | 6/2012 | Yamaguchi et al. |
| 2012/0298706 A1 * | 11/2012 | Gordon ................ B25J 15/0491 |
| | | 224/401 |
| 2013/0000683 A1 | 1/2013 | Alvarez |
| 2013/0011234 A1 | 1/2013 | Pretlove et al. |
| 2013/0030661 A1 * | 1/2013 | Opperman ................ B25J 5/005 |
| | | 701/50 |
| 2013/0104361 A1 * | 5/2013 | Corfitsen ................. B60L 53/80 |
| | | 29/402.08 |
| 2013/0231777 A1 | 9/2013 | Salamanca |
| 2013/0231779 A1 * | 9/2013 | Purkayastha ........ G05D 1/0088 |
| | | 700/258 |
| 2013/0268118 A1 * | 10/2013 | Grinstead .............. B25J 13/006 |
| | | 700/259 |
| 2015/0107075 A1 * | 4/2015 | Clarke .................. B23P 19/033 |
| | | 29/703 |
| 2015/0233077 A1 | 8/2015 | Linley |
| 2015/0368884 A1 * | 12/2015 | Cheyne ................. E02F 9/2841 |
| | | 37/453 |
| 2016/0065901 A1 | 3/2016 | Padate et al. |
| 2016/0237657 A1 | 8/2016 | Carpenter et al. |
| 2018/0317397 A1 * | 11/2018 | Carter .................. B25J 15/0033 |
| 2020/0102722 A1 * | 4/2020 | Saunders ............... E02F 9/2883 |
| 2021/0198871 A1 | 7/2021 | Paul et al. |

FOREIGN PATENT DOCUMENTS

| | | |
|---|---|---|
| CN | 202071702 | 12/2011 |
| DE | 29902127 U1 | 6/2000 |
| EA | 0013772 | 4/2009 |
| EP | 1522636 | 4/2005 |
| EP | 2559815 | 3/2014 |
| JP | 7-61797 | 3/1995 |
| JP | H08-120710 | 5/1996 |
| JP | 2007-508475 | 4/2007 |
| JP | 5801738 B2 | 10/2015 |
| JP | 5941663 B2 | 6/2016 |
| RU | 2016756 C1 | 7/1994 |
| RU | 7114 U1 | 7/1998 |
| SU | 1735512 | 5/1992 |
| WO | 1999039651 | 2/1998 |
| WO | WO2005035884 A1 | 4/2005 |
| WO | 2007/0149295 | 12/2007 |
| WO | WO-2009110842 A1 * | 9/2009 ............ B25J 13/086 |
| WO | 2014/1053591 | 10/2014 |
| WO | 2015/061232 | 4/2015 |
| WO | WO2017218591 | 12/2017 |

\* cited by examiner

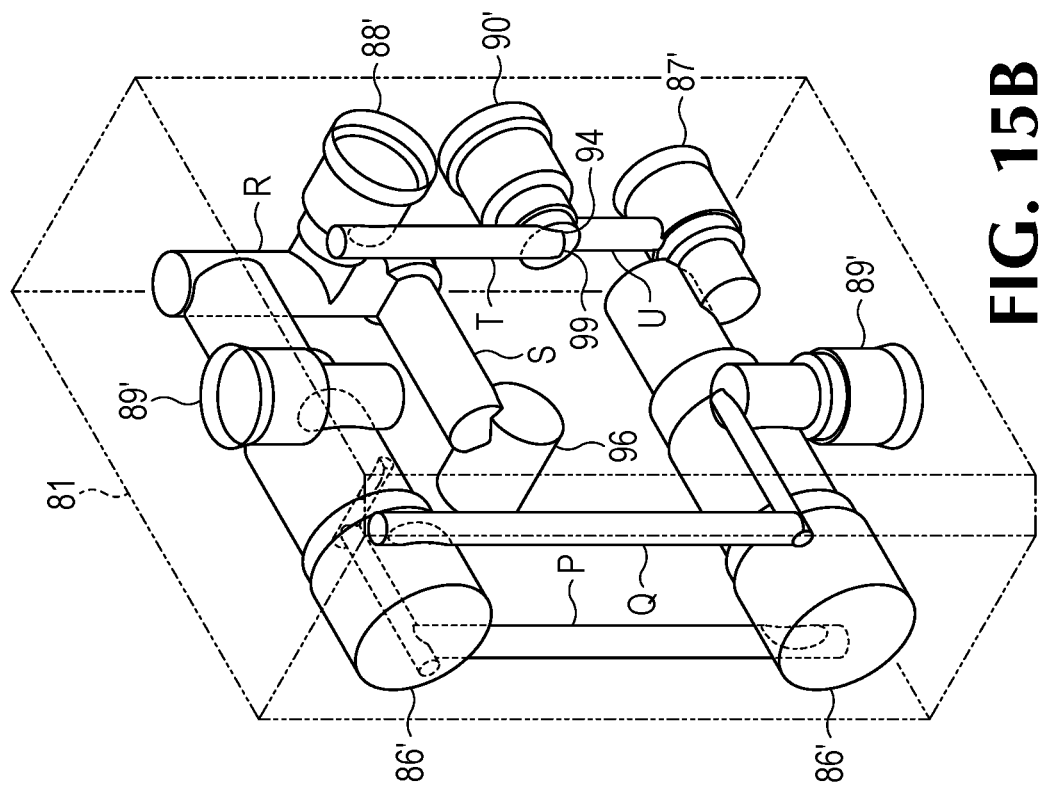
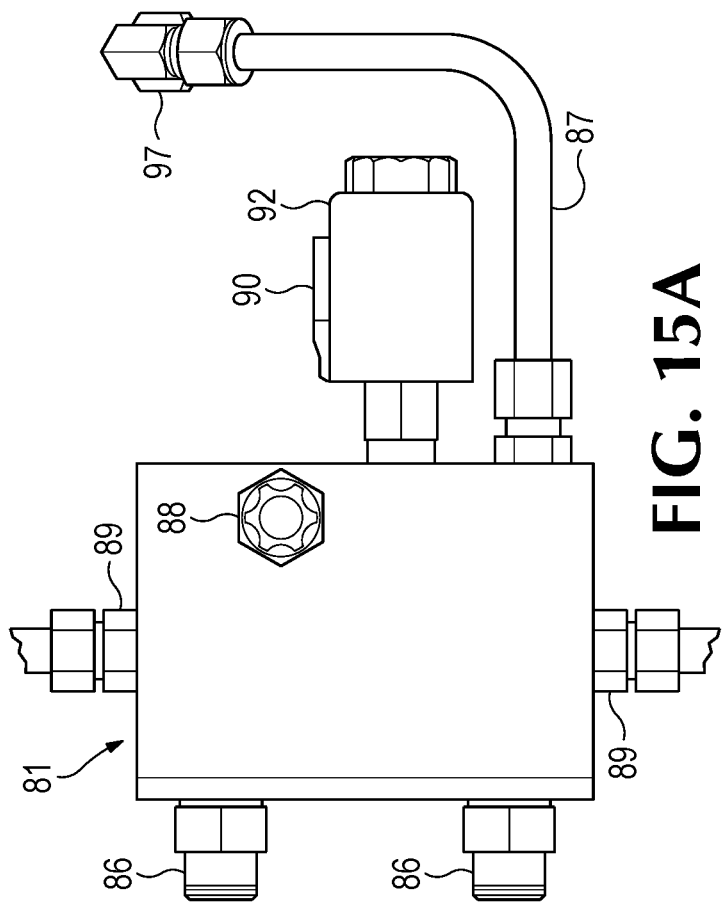
FIG. 15B
FIG. 15A

SYSTEM AND PROCESS FOR CONDUCTING IN-FIELD OPERATIONS

FIELD OF THE INVENTION

The present disclosure pertains to a system and process for conducting in-field operations.

BACKGROUND OF THE INVENTION

In mining and construction, wear parts are commonly provided for earth working equipment such as excavators, crushers, dragline machines, cable shovels, face shovels, hydraulic excavators, loaders, shear drums, bucket wheel excavators and the like. One example wear part is a tooth that includes a point mounted on an adapter secured to a bucket. Wear parts such as points and other ground-engaging components encounter heavy loading and abrasive conditions during use such that the wear part wears out and needs to be replaced. However, there are challenges and hazards associated with the removal and installation of such wear members as they can be large, heavy and/or unwieldy.

SUMMARY OF THE INVENTION

The present disclosure pertains to a system and process for conducting in-field operations such as removing and/or installing wear members from and/or onto earth working equipment.

In one example, a wear member is secured to a base on an earth working equipment. A tool supported by a manipulator is secured to the wear member. At least one sensor detects the mounting path of the wear member, and a controller using programmable logic moves the wear member along the mounting path to remove the wear member from the base. In one implementation that mounting path may be a straight line or discrete non-linear (e.g. arcuate, stepped, or some combination of linear and non-linear).

In another example, a handling apparatus includes a tool securable to a wear member, a manipulator having the capability of at least two different kinds of motion movably supporting the tool, at least one sensor detecting the movement of each kind of motion, and a controller using programmable logic to direct the movements of the manipulator to move the tool in a defined motion to remove and/or install a wear member from and/or onto a base.

In another example, a system for removing and/or installing a wear member from and/or onto earth working equipment includes a handling apparatus having a tool securable to a wear member, an articulated arm movably supporting the tool, an adjustable joint connecting the tool to the arm, a sensor(s) to detect the position of each portion of the articulated arm and the adjustable joint that can move the tool, and a controller using programmable logic to concurrently direct the movements of the arm and the joint to move the tool along a designated path of motion to remove and/or install the wear member from and/or onto a base. The sensor(s) determining the designated path may be part of or separate from the handling apparatus.

In another example, a handling apparatus includes a tool, a manipulator having a support and a joint, and a controller. The support includes a rotatable post, a first arm pivotally secured to the post and a second arm pivotally secured to the first arm. The second arm can also optionally be telescoping. The joint connects the tool to the support. The joint is pivotally secured to the second arm about a first axis and can provide movement of the tool about two axes perpendicular to the first axis. The controller using programmable logic directs the operation of the manipulator to remove the wear member from earth working equipment in a motion along a designated path.

In another example, a tool supported by a manipulator is secured to a wear member to be removed from and/or installed on a base. A least one sensor detects the position and/or orientation of the path along which the wear member is to be installed on or removed from the base. A controller using programmable logic directs the movements of the manipulator to move the wear member off or and/or onto the base along the designated path.

In another example, removal and/or installation of a wear member from and/or onto a base is achieved by gripping the wear member with an apparatus, which uses programmable logic to move the wear member from and/or onto the base along the designated path for the wear member.

In another example, the mounting axis for removing and/or installing a wear member from and/or onto a base is detected. The wear member is gripped by a hydraulically driven apparatus, which uses programmable logic to move the wear member along the mounting path from and/or onto the base.

In another example, a handling apparatus for removing a worn wear member from a mount (e.g. a base adapter on an earth working equipment, a lip on a bucket, an adapter on a base adapter, etc.) and installing a replacement wear member on the same mount. The handling apparatus includes a tool to secure a wear member for earth working equipment, a manipulator supporting the tool for motion toward and away from the earth working equipment, and a controller using programmable logic to direct the movements of the manipulator to remove and stow a worn wear member, and hold and install a replacement wear member where the worn wear member was removed. The controller automatically returns to the mounting site for installation of the replacement wear member on the earth working equipment. Optionally, after the replacement wear member is installed, the controller could automatically move to the next wear member to be removed. This example can also optionally be provided in combination with any of the above-noted examples.

The adjustable components in the each of above noted and other examples can be driven by hydraulic motors and/or cylinders, which can provide the robustness and strength desired for removing wear members in an earth working operation.

In one example, a three-point joint assembly includes a computer having a processor and memory, the memory having instruction configured to provide control of a three-point joint assembly, manipulator, and/or supported tool head(s).

In another example, a hydraulically driven manipulator includes a joint attached the end of an articulated arm. The joint supports a tool holding a wear member to be removed from and/or installed onto a mount. The joint includes components movably joined together to define three non-parallel axes of movement for the tool. In one example, at least one of the three axes (and preferably two) has a float mode mechanism associated with the actuator(s) that controls the movement of the three-axis joint with respect to the three axes. The float mode mechanism controls the valve pressure in a passageway that connects both sides of at least one of the actuators that controls the manipulator about an axis. The fluid in the actuator is allowed to float between both sides of the actuator, therein allowing the manipulator to move about the respective axis in small increments. In the float mode, the actuator is moved by external forces outside of the operator or controller or processor. In one implementation, at least one float mode mechanism may be activated. In another implementation, at least two float mode mechanisms are activated while the third actuator is still controlled by either programmable logic or a user. In one implementation, if the mounting path mode is activated while also in the floating mode, the manipulator assumes the floated hydraulic actuators are controllable, even though the actuators are controlled by external forces. In this example, once the mounting axis is determined and all other actuators are concurrently moved along the mounting path and the floated actuators are assumed to be following the correct path along the mounting axis.

In another example, a process for removing ground-engaging wear parts from earth working equipment includes operating the movements of a manipulator and one or more tools supported by the manipulator to hold a wear part secured to the earth working equipment. The manipulator includes a joint to secure the tool to the manipulator. The joint includes components movably joined together to define three non-parallel axes of movement and hydraulically driven actuators to selectively move and hold the components about the axes. The process may further include the determination of a mounting axis. In another implementation, the process may include a float mode process, where the actuator is moved to a neutral state and the fluid is counterbalanced within the actuator to allow for small incremental changes that attach a tool head to a wear member.

In another example, a wear member handling system for removing and/or installing wear members from and/or onto a mount on an earth working equipment includes a crane with crane components movably joined together and crane actuators to selectively hold and move the crane components in various positions relative to each other, at least one tool for selectively holding the wear member, a joint including a base to secure the joint to the crane, an adapter to secure the at least one tool to the joint, joint components movably joined together between the base and the adapter, and joint actuators to selectively move and hold the joint components in various positions relative to each other, and a processing system configured to determine a path for removing a wear member from the mount and/or installing the wear member onto the mount, and directing the movements of the crane actuators and the joint actuators to move the wear member along the path.

In another example, a wear member handling system for removing and/or installing wear members from and/or onto a mount on an earth working equipment includes a manipulator supporting the wear member and including hydraulic actuators to adjust the manipulator and thereby move the wear member, a processing system configured to determine a path for removing a wear member from the mount and/or installing the wear member onto the mount, and directing the movements of the hydraulic actuators to move the wear member along the path, and a float manifold to direct a flow of a fluid within the actuators and allow for small adjustments to the joint from external forces as the wear member is moved along the path.

In another example, a wear member handling system for removing and/or installing wear members from and/or onto a mount on an earth working equipment includes a manipulator supporting the wear member and including hydraulic actuators to adjust the manipulator and thereby move the wear member, a processing system configured to direct the movements of the hydraulic actuators to move the wear member along a straight-line path, and a controller with at least a manually-activated control to signal the processing system as to which direction the wear member should be moved.

In another example, a system for conducting an in-field operation includes a manipulator including hydraulic actuators and at least one sensor for detecting the position of the manipulator, at least one tool secured to the manipulator, and a processing system configured to determine the path for moving the at least one tool for the in-field operation and directing the hydraulic actuators adjusting the manipulator to move the at least one tool along the path.

In another example, a process for removing a ground-engaging wear member from a mount of an earth working equipment and/or installing the ground-engaging wear member onto the mount includes positioning the ground-engaging member in alignment with the mount, using a processing system to determine a path over which the ground-engaging wear member should travel to be removed from on the mount and/or installed on the mount, and using the processing system to direct a manipulator supporting the ground-engaging wear member to move the ground-engaging wear member along the path to remove the ground-engaging wear member from the mount and/or install the ground-engaging wear member onto the mount.

In accordance with certain examples, a manipulator may be usable to remove wear parts from equipment and/or install wear parts on equipment in mining, construction, dredge and/or other earth working operations. As examples, such earth working equipment can include, for example, various machines (e.g., excavators, crushers, cable shovels, cutter heads, etc.) and/or conveying equipment (e.g., chutes, conveyors, truck trays, etc.). The wear parts can include, e.g., points, adapters, shrouds, runners, picks, runners, wear plate, track components, blades, etc.

In accordance with certain examples, a manipulator may be usable for varied activities, particularly those involving difficult, hazardous and/or time-consuming processes such as equipment refueling, plane de-icing, tree trimming, elevated agricultural harvesting, precision-controlled work in an industrial setting, etc.

BRIEF DESCRIPTION OF THE DRAWINGS

FIG. 15A is a side view of a float control manifold.

FIG. 15B is a perspective view of fluid pathways within the casing of the float control manifold of FIG. 15A shown in phantom.

DETAILED DESCRIPTION OF THE PREFERRED EXAMPLES

The present disclosure pertains to systems, handling apparatuses and/or processes for removing and/or installing wear members, such as ground-engaging products used in earth working operations such as found in mining, construction, mineral processing, dredging, etc. The systems, apparatuses and/or processes can be used to remove and/or install a wide variety of wear members (e.g., teeth, shrouds, runners, picks, etc.) from and/or onto earth working equipment, which can include various different machines such as hydraulic excavators, loaders, dragline machines, cable shovels, face shovels, dredge cutters, shearers, communication devices, continuous miners, haul trucks, etc., and/or various components used in connection with the machines such as buckets, cutter heads, shearer drums, truck trays, chutes, etc.

Figure 1:
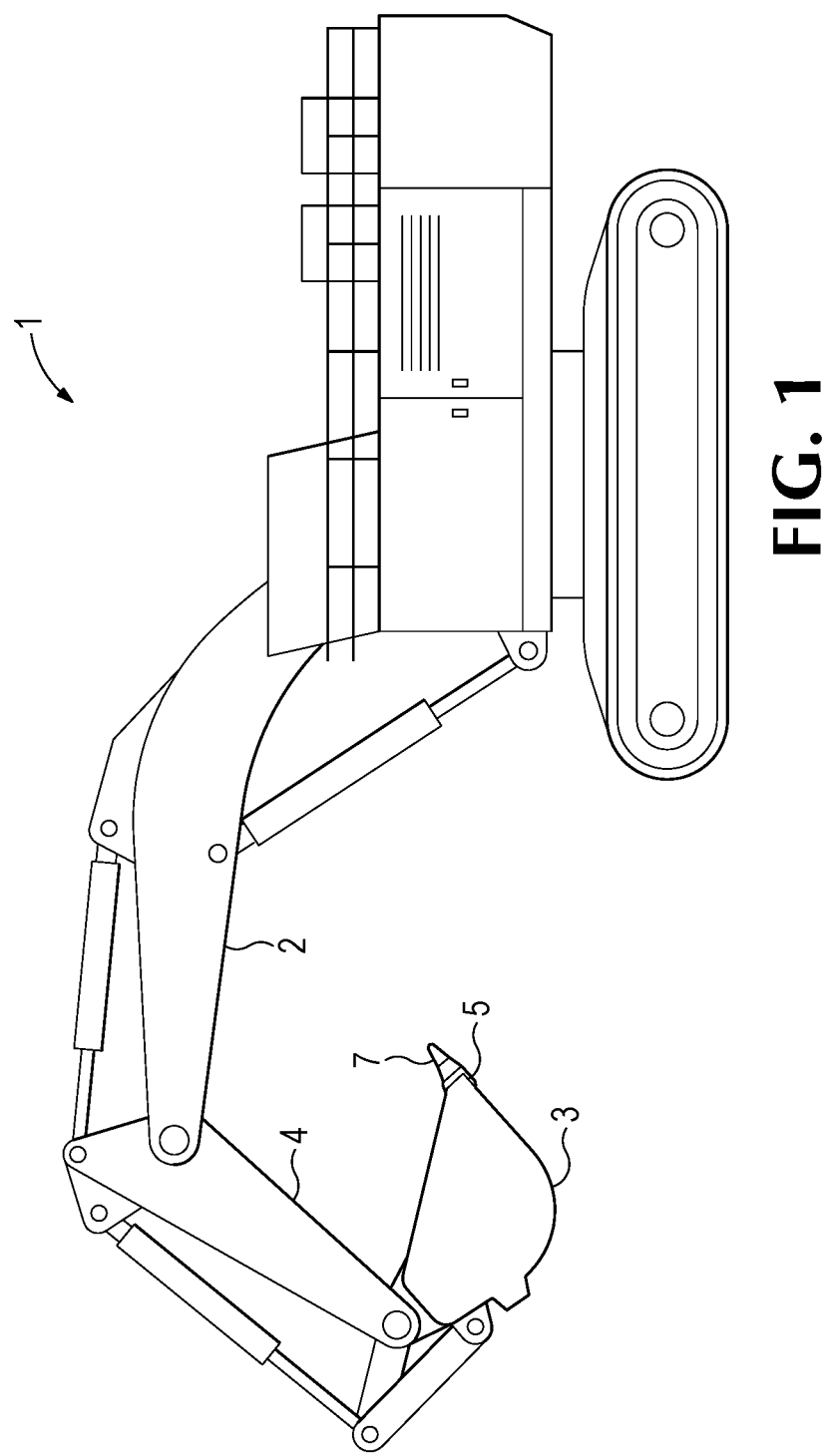
FIG. 1 is a side view of an earth working machine with a bucket having teeth.

With reference to FIG. 1, an earth working machine, such as a hydraulic excavator 1 is illustrated, as an example, to include a bucket 3 having a front digging edge 5 including a lip 16. Teeth and/or shrouds may be secured along the digging edge 5 to protect the bucket 3 and/or improve its digging performance.

Figure 2:
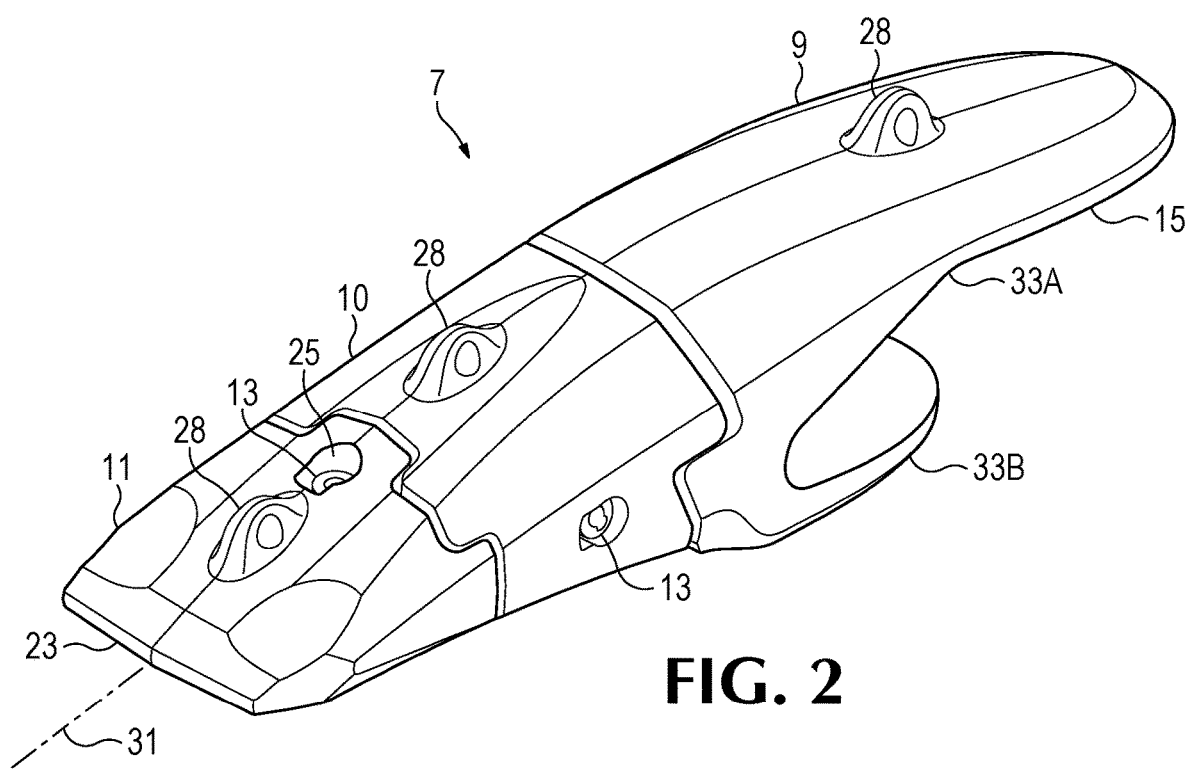
FIG. 2 is a perspective view of an excavating tooth.
Figure 3:
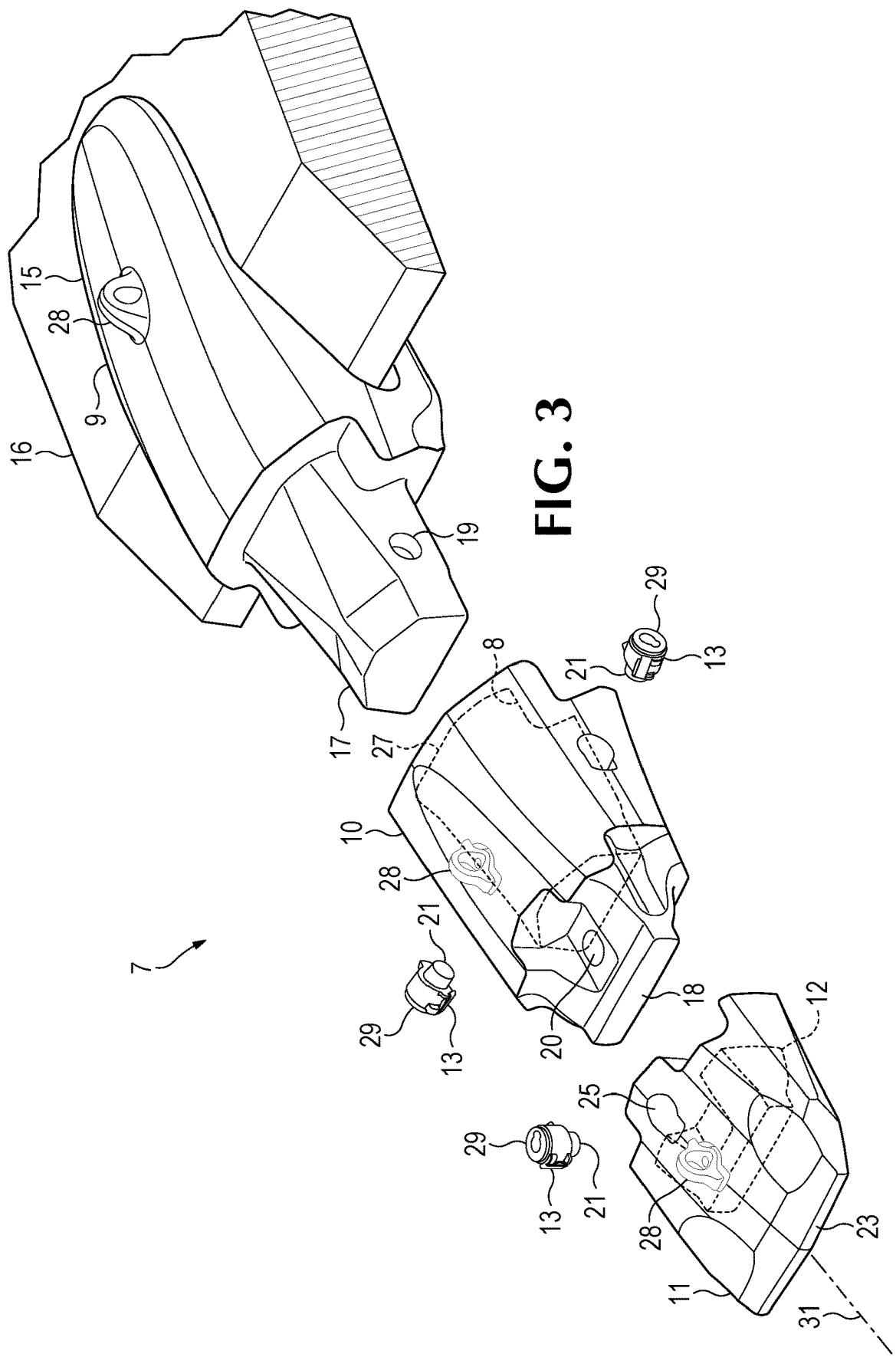
FIG. 3 is an exploded, perspective view of the tooth in FIG. 2.

FIGS. 2-3 illustrate one example excavating tooth 7. This tooth includes a base adapter 9, an intermediate adapter 10, a point 11, and locks 13. The base adapter 9 has a mounting end 15 with rearwardly-extending legs 33A, 33B to straddle the lip 16 and be welded or otherwise secured to the lip 16, and a forwardly-projecting nose 17 to mount the intermediate adapter 10. A recess 19 is provided in each sidewall of the forwardly-projecting nose 17 to receive the leading end 21 of a pin 29, which is part of the lock 13 to secure the intermediate adapter to the base adapter 9. The intermediate adapter 10 includes a rearwardly-opening cavity 8 to receive the forwardly-projecting nose 17, a front nose 18 to mount the point 11, and a lock opening in each sidewall to receive a lock 13. The front nose 18 includes a recess 20 to receive the pin 29 of each lock 13 to secure the point 11 to the intermediate adapter 10. The point 11 includes a rearwardly-opening cavity 12 to receive the front nose 18, a front working end or bit 23, and a lock opening 25 in which is received a lock 13. The components of this example tooth are disclosed more fully in U.S. Pat. No. 9,222,243, which is incorporated herein by reference in its entirety. While the locks in this tooth are integrally secured to the point and intermediate adapter, the handling system 35 could remove and/or install wear members where the locks were separate from the point and intermediate adapter. This tooth is provided only as an example. In regard to this tooth, the point, the intermediate adapter and the base adapter are each considered a wear member. That is, the point 11 is a wear member 7 that secures to a mount in the form of an intermediate adapter 10. The intermediate adapter 10 is a wear member 7 that secures to a mount in the form of a base adapter 9. The base adapter 9 is a wear member 7 that secures to a mount in the form of the lip 16. The systems, apparatuses and processes disclosed herein can be used with a variety of other kinds of teeth, other kinds of ground-engaging wear parts, and/or other kinds of earth working equipment.

Figure 4:
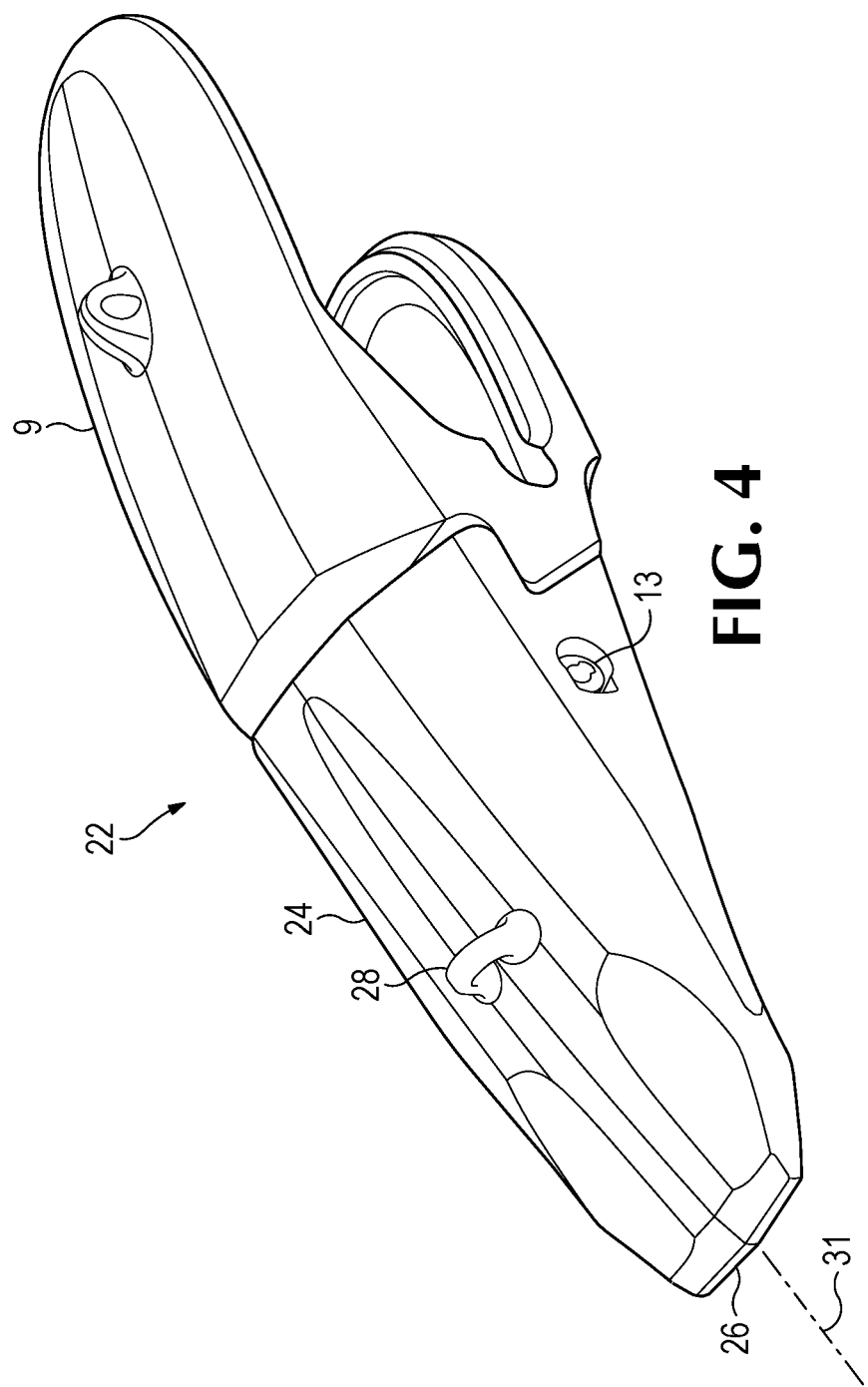
FIG. 4 is a perspective view of another excavating tooth.
Figure 5:
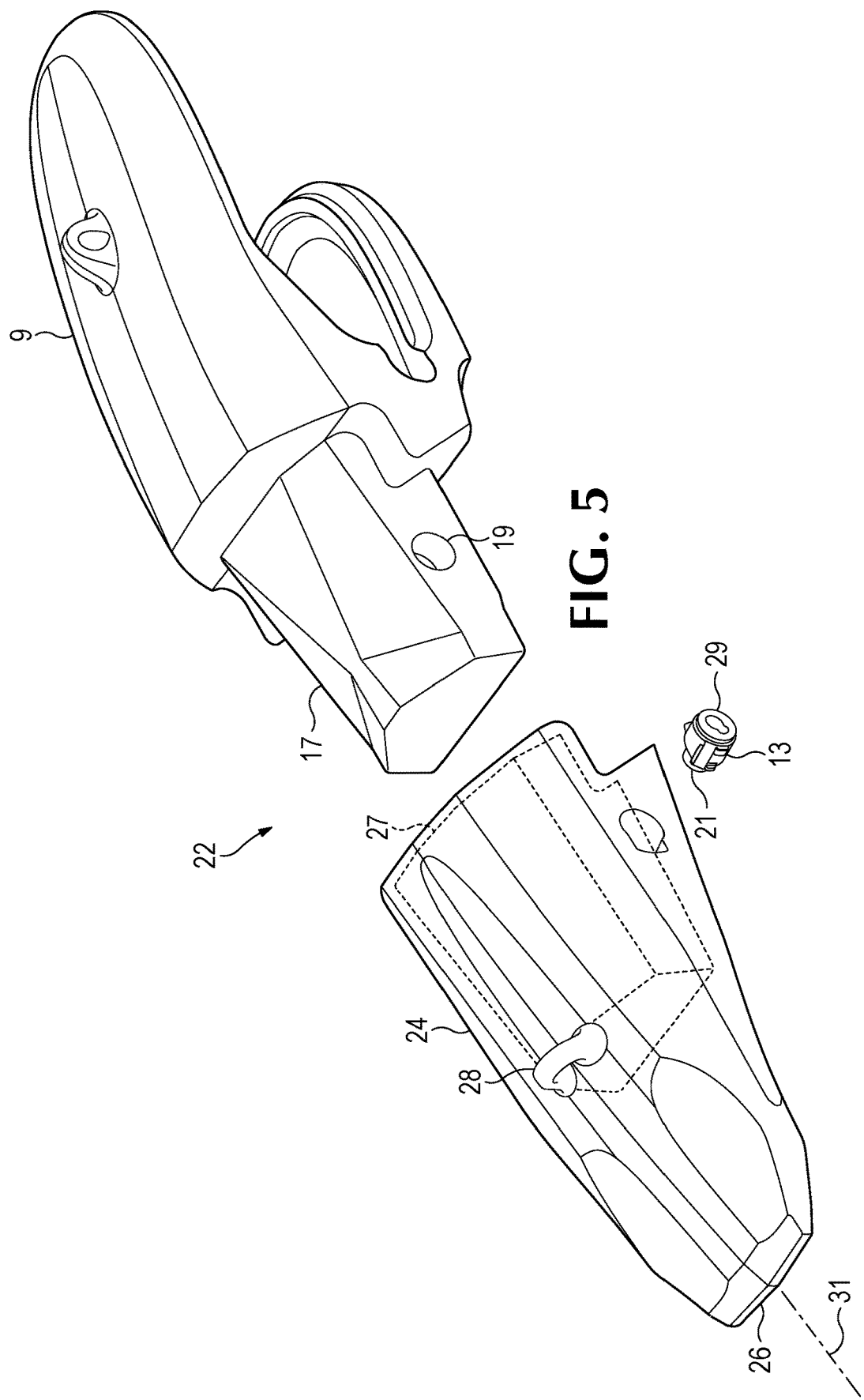
FIG. 5 is an exploded, perspective view of the tooth in FIG. 4.

FIGS. 4-5 illustrate another example excavating tooth 22 with which the present systems and processes can be used. Tooth 22 includes base adapter 9 and a point 24 having a rearwardly-opening cavity 27 to receive the forwardly-projecting nose 17 and a front working end or bit 26, and a lock 13 in one sidewall. As with tooth 7, pin 29 of lock 13 is advanced into recess 19 to secure point 24 on base adapter 9.

As the bucket 3 digs, the wear members (including point 11, 24 and adapters 9, 10) wear until they are worn out and need to be replaced. As an example, in a conventional operation, this may involve one or more workers to release the lock and remove the point from the adapter. This can create hazards for the workers as the parts can be large, heavy and/or unwieldy with the potential of causing injury. The lifting eyes 28 commonly provided on large new parts would ordinarily have worn away and not be available for removing the worn parts. As a result, some workers simply let the parts fall to the ground when the lock 13 is released. Freefall dropping of the wear members can be hazardous to the workers.

At times, though, the presence of earthen fines can cause a wear member such as the point 11 to be held fast to the earth working equipment (e.g., adapters 10, 11) even when the lock 13 is removed. This can make removal of the wear member from the base difficult and increase the time the operator takes to remove them. A longer removal time not only results in longer machine downtime and lost productivity, but also increases the time the worker is in a hazardous work zone. Moreover, the leveraging, pulling, hammering, etc., which the worker may use to release the wear member, can also create hazards for the worker especially if the wear member shifts and/or releases.

Complex rigging arrangements involving chains or straps have been used to support a point to be removed when the lock is released. While this can create a safer environment, the worker is still at risk if the rigging arrangement is unsecure, slips and/or creates pinch points. Further, since the chains and straps go under the points, removal of them once the wear member is set on the ground can be problematic and create additional hazards. A lifting eye 28 has also at times been welded to a worn point to support the point during removal, but this is often not desirable because of the need for mobile welding equipment, a welding prohibition at many mine sites, and/or the time-consuming process needed to weld to the points because they are made of very hard steel, which can require special processes to ensure a good weld.

U.S. Patent Publication 2017/0356167 discloses a handling apparatus, which is herein incorporated by reference in its entirety. This apparatus permits the worker to remove and install points while being remote from the bucket. While this is a safer arrangement for the worker, removal of the points can at times still be a difficult process. On account of the tight fits (e.g. small tolerances) that can exist between the wear member and the base and/or the accumulation of impacted fines, the wear member must commonly be pulled from a mount in a straight-line (or other) motion along the tooth's mounting path (e.g., along a mounting axis 31), i.e., the path 31 along which the wear member is installed onto and removed from the base. As this handling apparatus is a hydraulically driven, manually controlled system, a direct, exact, straight-line motion is impossible. As a result, the wear member often cants during removal and generally requires some time by a skilled worker of working the controls to eventually maneuver the point 11 from the front nose 18 of the adapter 10. Further, in general, the deeper the mounting cavity (such as cavity 27 for teeth 24 shown in FIGS. 4 and 5), the greater the need to remove the point 11 along the mounting axis 31.

Figure 6:
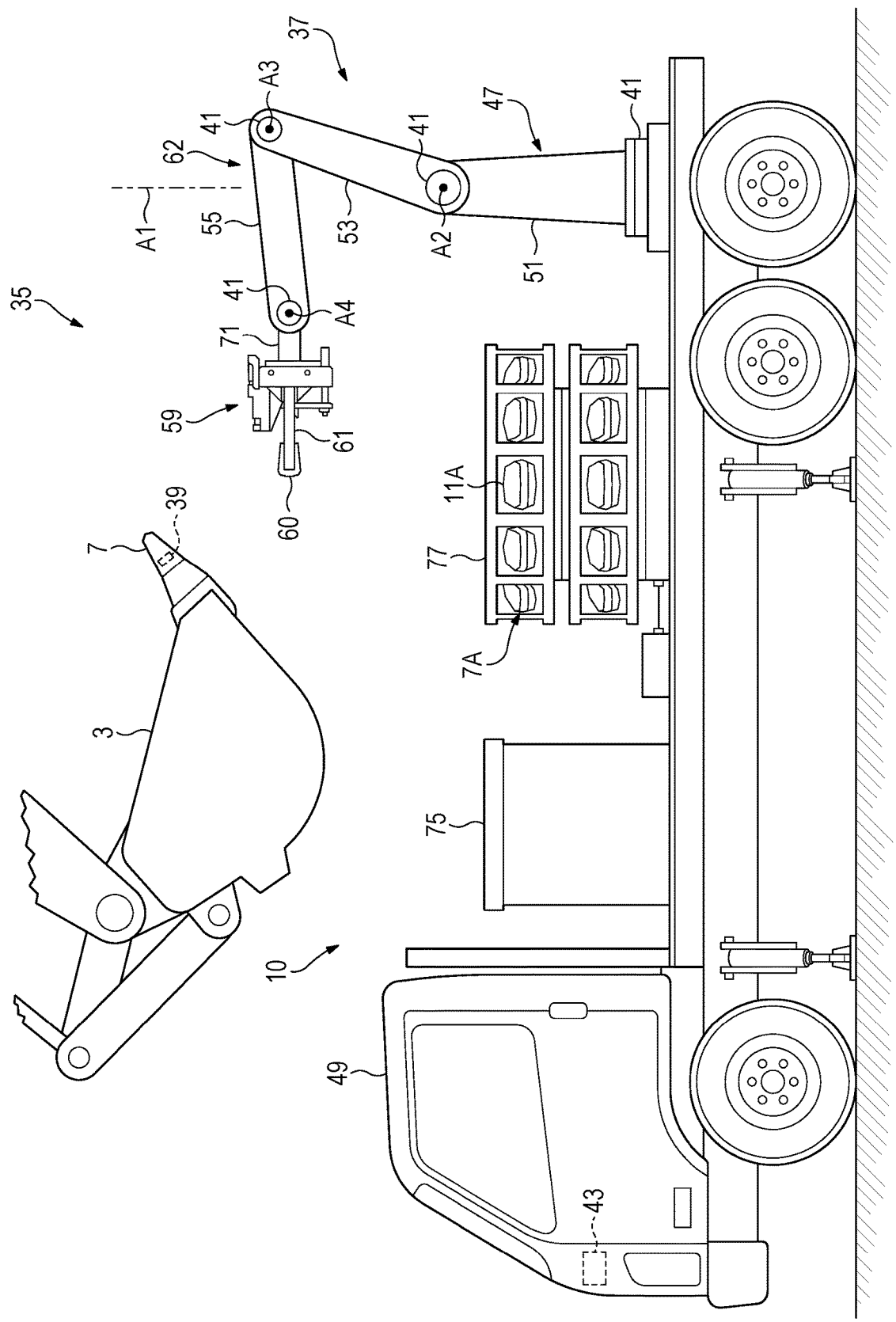
FIG. 6 is a side view of a handling system and a portion of an earth working machine.
Figure 10:
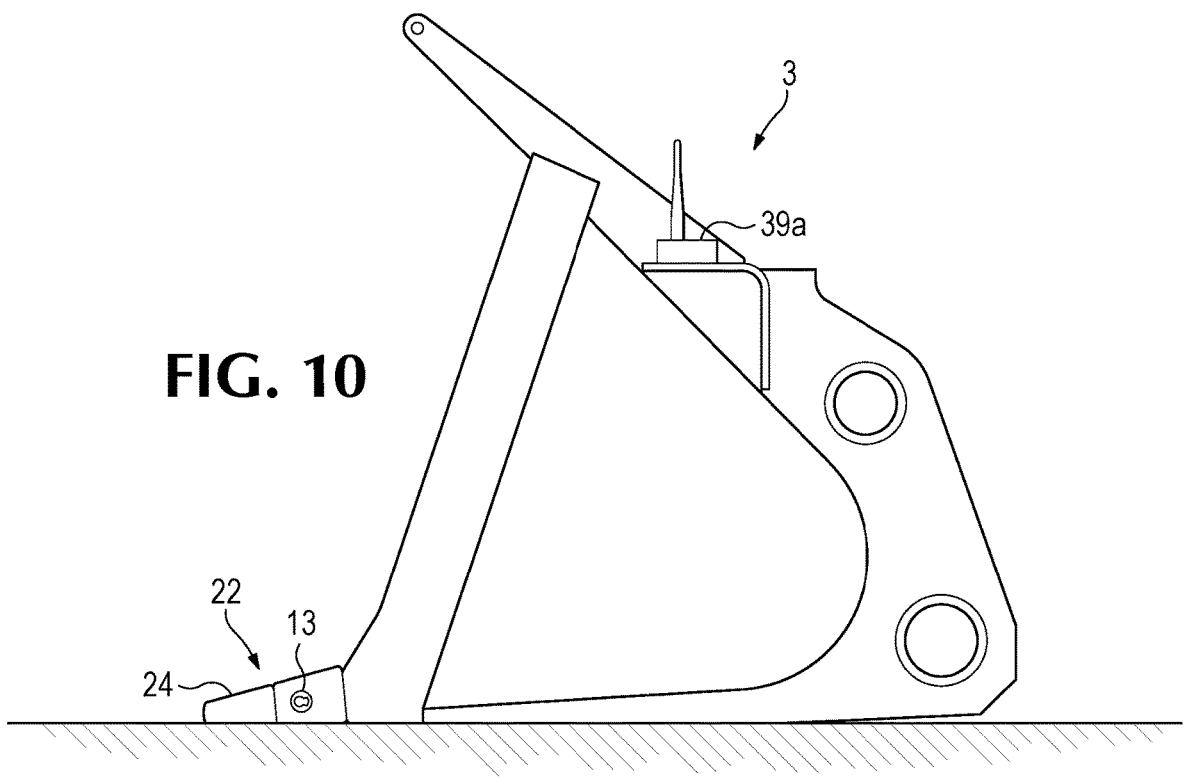
FIG. 10 is a side view of a bucket.

With reference to FIG. 6, system 35 is usable to remove and/or install wear members (e.g. points 11, 24 and other kinds of wear members) from and/or on a bucket 3 (or other kinds of earth working equipment). In this example, the earth working equipment includes an electronic device 39 such as a sensor, beacon, RFID tag, Bluetooth® transmitter, etc. and/or some combination of such devices. As illustrated, the earth working equipment includes a bucket 3 for carrying a load. The bucket 3 has a lip 16 that supports teeth 7, one or more of which includes the electronic device 39. Alternatively, or additionally, the bucket 3 may further include an electronic sensor 39A (e.g., a sensor, beacon, and/or combination of such devices)(FIG. 10). The location of the sensors or the like in the drawings are given as examples. These electronic devices 39, 39A could for example be included in the point, adapter, lip, shroud, bucket wall and/or on top of the bucket. Sensors 39, 39A are optional.

In one implementation, when one or more wear members need to be replaced, an operator of the earth working equipment 1, such as the hydraulic excavator 1 shown in FIG. 1, will set the bucket 3 into a position where the teeth 7, 22 can be accessed by a handling apparatus 37 for removal of the worn points. As can be appreciated, the operator of the earth working machine 1 may not set the bucket 3 in any kind of precise position when the points 11 need to be replaced. The spatial position, inclination and orientation of the bucket 3 will vary each time the points 11 need to be replaced. Moreover, the position and orientation of the handling apparatus 37 and vehicle 49 relative to the bucket 3 will also vary. An electronic device (e.g., sensor 39, 39A) may be used to aid in determining the position and/or orientation of the worn wear member. In such cases, system 35 includes a complementary electronic device 41 on handling apparatus 37 or elsewhere, which can with programmable logic detect the position and/or orientation of the wear members to be removed. Alternatively, or additionally, sensors can be in the form of a camera, laser scanner or the like and could be secured to the handling apparatus, service vehicle or elsewhere to determine the position and/or orientation of the wear members to be removed and replaced. The various sensors could also be used to determine when a wear member needs to be replaced such as disclosed in U.S. Pat. Nos. 9,670,649, 10,011,975 and/or U.S. Published Application 2016/0237640, which are each herein incorporated by reference in their entirety.

In addition, the bucket (or other equipment) position can make assessing the condition of the wear parts and/or replacing the wear parts difficult and/or hazardous. It is common for mining machines to be shut down with lockout/tag-out safety precautions prior to workers approaching the machine for inspection and/or replacement of the wear parts. At times the bucket 3 is not situated prior to shutting down in a position that is convenient or permissible for a worker to assess and/or replace the wear parts either because the bucket was oriented to perform other maintenance (e.g., welding) or inadvertence by the operator. In such cases, particularly with the increased emphasis on ergonomics and safety for workers, authorized personnel have had to untag, unlock and restart the machine, and adjust the bucket to a suitable position—all of which leads to longer machine downtime and less production. By using the system 35 with appropriate tool heads, the inspection and/or replacement of wear parts 7 can be achieved even when the bucket 3 is not suitably positioned, e.g., the digging edge 5 may be too high off the ground, tilted too far upward, oriented beneath the equipment, etc. for manual inspection and/or work.

At other times, multiple operations need to be done on the bucket 3 when the machine 1 is shut off. As one example, the bucket 3 may need welding repair as well as wear part 7 replacement. At times, these operations are scheduled successively instead of concurrently because of the risk associated to one or more of the workers. For example, a welding operation may require a portion of a bucket 3 to be isolated and shielded as a safety precaution, which could prohibit the inspection and/or replacement of wear parts 7 on the bucket 3. Use of the system 35 with the appropriate tools 59 may enable concurrent operations as it removes the otherwise additional worker from the isolated area. Further, system 35 with appropriate tools may be able to perform both operations concurrently without risk of harm to a worker. Use of system 35 also eliminates the additional time that may otherwise be needed following safety precautions such as erecting safety barriers.

The system 35 improves the ease, speed and/or safety of the process for removing points 11 from the front nose 18 (or other wear members from the earth working equipment). In other examples, the system 35 may be used to remove and/or install other kinds of components or equipment, particularly those that are heavy or involve a hazard such as high placement, tight quarters, extreme temperatures, hazardous environments (e.g., dust, toxic, caustic, etc.), etc. The system 35 may also be used to perform other operations such as inspection and/or repair of components, equipment and/or other things. In one example, the manipulator can support a tool in the form of a camera, scanner, range finder or other means to perform or assist inspections and/or repair, particularly where the component, etc. to be inspected and/or repaired is high, in tight quarters, difficult to access or otherwise hazardous or difficult for a person to manually access and/or inspect. Such inspections and/or repair may, e.g., include runners or wear plate in a chute or truck tray, bridges structures, roofs or other building structures, power or telephone poles and lines, earthen banks and/or other earthen structures (such as to inspect for bank stability), etc. The system 35 may be used to hold and control a nozzle for cleaning (e.g., using water and/or abrasive), changing blades on earth working equipment, rail car coupling changing, etc. The manipulator may be used for varied in-field activities, particularly those involving difficult, hazardous and/or time-consuming processes such as equipment refueling, plane de-icing, tree trimming, elevated agricultural harvesting, etc.

The term tool herein is also intended as a general term that refers to one or more apparatus, device, component, assembly, sub-assembly or the like that conducts, participates in, assists and/or takes part in an operation, which, e.g., may include removal, installation, inspection, repair, refueling, deicing, harvesting and/or other operations. The tool may consist, e.g., of one component, a plurality of components working cooperatively, and/or a plurality of components performing different operations concurrently or separately. As a few examples, tool heads may include one or more of grippers, pulling assemblies, vibrators, cleaning apparatus, unthreading and/or threading assemblies, welding equipment, impact devices, cutting apparatus, dispensing implements, magnets, cameras, range finders, sensors, etc.

Relative terms such as front, rear, top, bottom and the like are used for convenience of discussion. The terms front or forward are generally used to indicate a direction toward the component, equipment, machine, structure, ground, vegetation, etc. that is the subject of the operation to be conducted (such as the removal, installation, inspection, repair, cleaning, refueling, harvesting or other operation). Similarly, the terms upper or top are generally used as a direction or position farther from the ground or other support for the manipulator. Nevertheless, it is recognized that in various operations the manipulators may be oriented in various ways and move in all kinds of directions during use.

In one example, system 35 may include a vehicle 49, a handling apparatus 37, at least one computer 43 having memory and a processor or controller using stored programmable logic, sensors 39, 39A, 41, storage bin 75, and stowage 77. A vehicle 49 may house the computer 43, handling apparatus 37, storage bin 75, and/or stowage 77. The handling apparatus 37 includes a tool or tool head 59, such as a gripper 60 and/or driver 65, and a manipulator 62. The handling apparatus 37 may be stand-alone device or secured to a vehicle 49 or other mobile base. In the illustrated example of FIG. 6, the manipulator 62 includes a crane 47, a tool head 59 such as gripper 60, and a joint 71 or other coupler to secure the tool head to the crane. The tool 59 could grip the wear parts 7 or hold the wear parts 7 in other ways for removal from their bases and/or installation onto the bases.

Other arrangements are possible. The tool head 59 and manipulator 62 could include features and/or auxiliary tools such as disclosed in U.S. Publication No. 2015/0104075, which is incorporated herein in its entirety, and/or U.S. Publication No. 2017/0356167.

Figure 19:
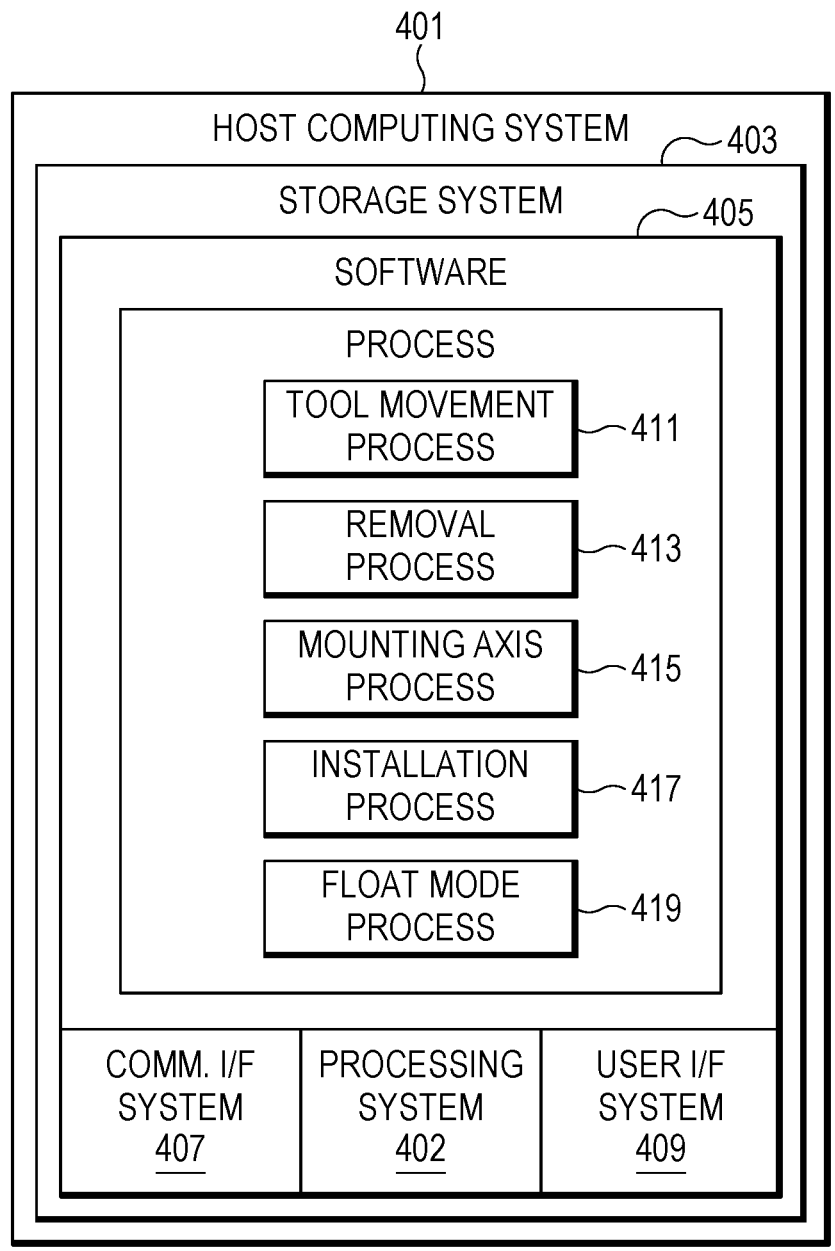
FIG. 19 is a schematic system diagram illustrating a system.

The handling apparatus 37 may include a host computer 43. The computer 43 may have a processor and memory having computer instructions, applications, programmable logic, and the like written and readable thereon. In the illustrated example, the computer 43 may also be remote from the apparatus 37. The computer 43 may include various components that are discussed below (FIG. 19). The term processor as used herein could include one or more processors for the system. The host computer 43 could be one or more computers having CPUs mounted on the truck, crane, joint and/or tool head, or could be separate from the handling apparatus 37, such as part of a handheld device, mobile device, fixed station and/or office, and provide wireless or wired controls for autonomous and/or controlled motion of the handling apparatus 37.

The computer 43 may include instructions for a processor to be configured to provide information and analysis from received data from a sensor 39, 39A, 41, a database, other data sources, other remote device, etc. In one example, the computer 43 may simply facilitate communication between the handling apparatus 37 and various system components, (e.g. manipulator 62, gripper 60, crane 47, and the like), e.g., through a network by means of the communication device. Each of the system's various components may include individual computers and memory or a single computer 43 (distributed or otherwise) may control each of the various components of the system 35. In one example, the various components of the computer system 43 may be co-located, virtually, and/or may be distributed geographically. As those skilled in the art will appreciate, other exemplary computer systems 43 according to examples of the technology may include different components than those illustrated and described herein.

The computer 43 may include instructions for a processor or controller to be configured to control the handling apparatus 37 and/or electronic device or sensor 39, 39A, 41. Some or all of the actions of handling apparatus 37 could be fully or partially automated. The computer 43 may control the valves for the various hydraulic cylinders, actuators, and motors using data from sensors 39, 39A, 41. Other kinds of arrangements can be used particularly when other motors and actuators are used. This kind of control allows the worker to avoid contact with the wear parts and remain at a safe distance from the parts during a handling operation. Lasers (not shown) could be provided on the various components of the handling apparatus 37 or various other machines to provide sighting lines, which could help the operator position the drive tool 67 in the lock 13. Cameras could be provided on (in addition to the lasers or on their own) to aid in the connection of the apparatus 37 to the wear parts. The use of cameras can also be used to assist the operator or fully automate the operation of the apparatus 37. Further, some of the processes could be manually performed. For example, with other constructions, the lock 13 could be manually released by the worker after the tool head 59 engages and supports the wear part.

The system 35, using, e.g., appropriate sensors 39, 39A, 41, database(s) and/or a computer can detect the position and/or orientation of the wear member 7, and its mounting/removal path (which may be along an axis) 31, i.e., the path to remove (or install) the wear member whether it be straight, curved or a different defined path. Optionally, input could be received regarding the kind of wear member 7 through, for example, the sensor 39 in the wear member and/or sensor 41 on the handling apparatus 37, accessing a database, receiving input from a code on the earth working equipment, etc. The sensors 39, 39A, 41, however, are optional. As an alternative, the mounting path may be preloaded to be a straight-line (or other motion) such that once the worn wear member is gripped by the handling apparatus, the straight-line (or other prescribed) motion automatically occurs (through sensors in the crane, joint and/or tool head and computer processing) when the operator indicates the wear member should be removed by, e.g., a joy-stick controller, switch, etc. Removal along the removal path can also occur autonomously. Such a process could also be used in installation, i.e., the handling apparatus could move the wear member onto the mount along a straight-line or other mounting path.

Figure 7:
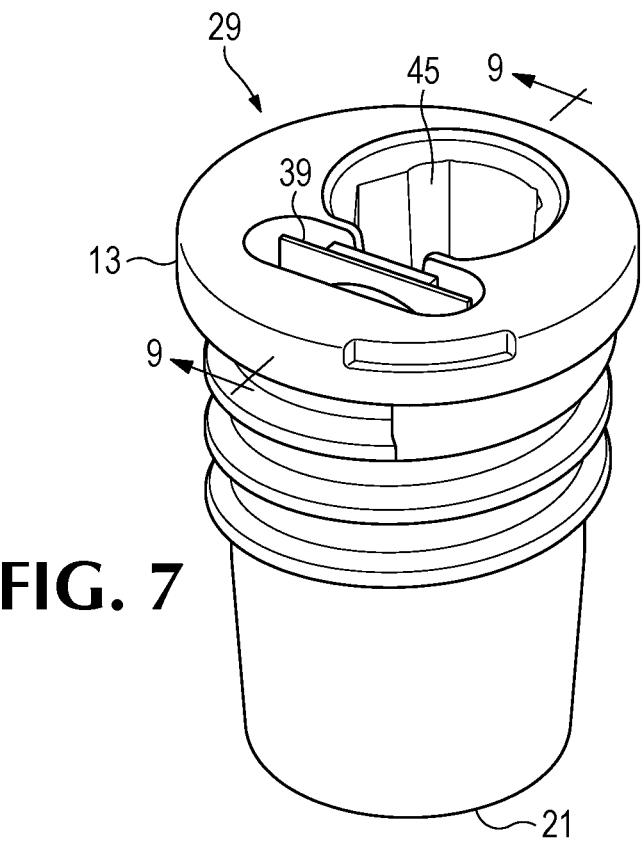
FIG. 7 is a perspective view of a pin of a lock for the tooth in FIG. 2.
Figure 8:
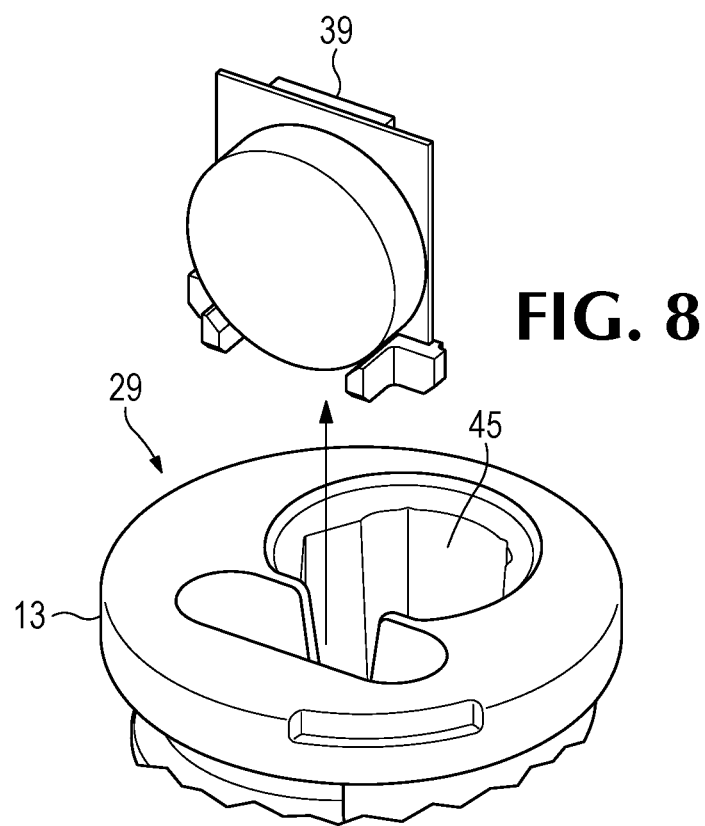
FIG. 8 is a partial, exploded view of the pin.
Figure 9:
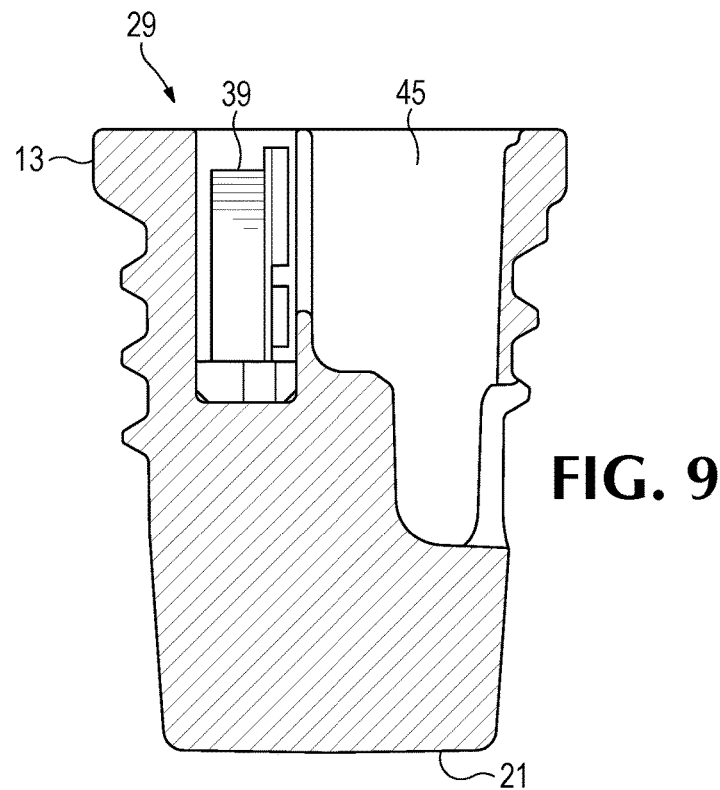
FIG. 9 is a cross-sectional view along line 9-9 in FIG. 7.

With reference to FIGS. 7-9, one or more sensor 39 can determine the position and/or orientation of the wear member to be removed. Such a sensor(s) could take on a number of different forms. For example, a sensor 39 could be provided in the point 11 to identify the 3-D orientation of the mounting path, which in this example is along a mounting axis 31. Such a sensor 39 could be provided in pin 29 of the lock 13 and/or in an opening in the cast body of the point 11 (not shown). For example, pin 29 could include a recess 45 that can receive not only a tool for driving the pin 29 in and out of contact with the intermediate adapter 10, but also receive and hold a sensor 39. The sensor 39 could, e.g., be as disclosed in U.S. Pat. No. 10,024,033, incorporated herein by reference in its entirety. The sensor 39 could detect the orientation of the wear member and/or the spatial position of the wear member, and wirelessly transmit a signal with the location information for use by the controller 43 in determining the orientation and/or position of the mounting axis 31. The sensor 39 could also have other functions, such as detecting unintended separation and/or wear of the wear member during use.

With reference to FIG. 10, in the illustrated example, a sensor 39A could be provided on the bucket 3 to detect the spatial positions and/or orientations of the mounting axes of the points on the bucket 3. Such sensors 39, 39A in the wear parts 24 and/or on the buckets 3 could, e.g., include GPS and/or inclinometers. Providing digital coordinates to the handling apparatus 37 could enable the apparatus 37 to automatically drive to the machine with wear members 24 needing replacement and/or provide navigation for a driver.

As another example, an image sensor such as a camera(s), on or separate from handling apparatus 37, could be used by the controller 43 along with programmable logic such as vision recognition software configured to determine the specific 3-D orientation and/or position of the mounting axis 31 of the tooth 7. The controller 43 could optionally access a database with details of the points 11 and the mounting axes 31 to make the desired determination. Other kinds of sensors are possible and/or two or more of the different kinds of sensors could be used in combination with each other.

Figure 13:
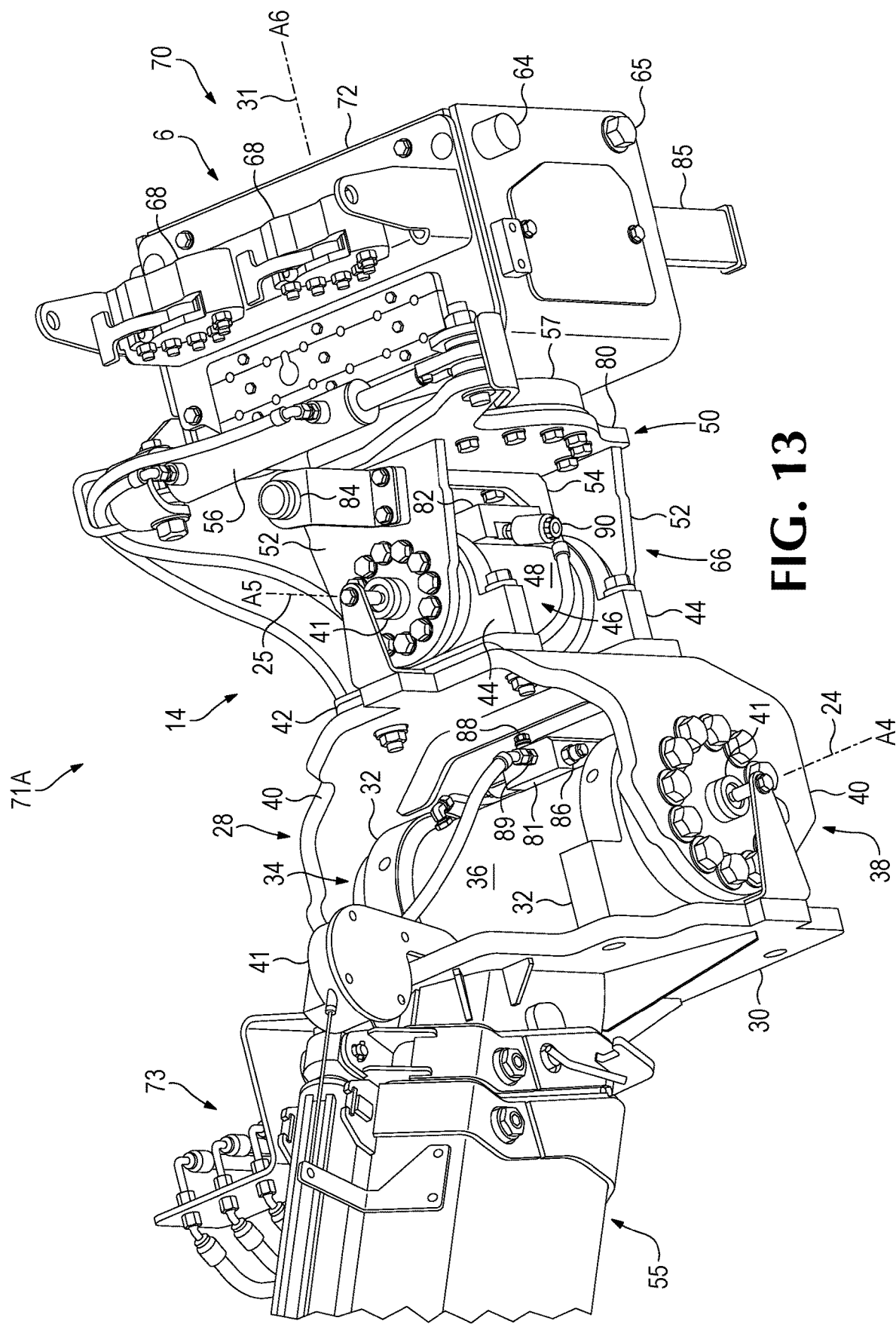
FIG. 13 is a perspective view of a three-axis joint.

The sensors 41 could be encoders or other kinds of sensors. If a second arm 55 is telescoping (e.g. an inner boom), then a sensor 41 may be provided to detect the arm's extension (FIG. 13). The sensor 41 is physically coupled with, and or/installed on the handling apparatus 37 and may be configured to detect or monitor a location of a worn wear member. For example, the sensor 41 on the handling apparatus 37 can be a passive sensor that collects data. In another example, the sensor 41 on the handling apparatus 37 can be active and/or positioned on the earth moving equipment 1. The sensor 41 may work in conjunction with a second sensor (e.g. 39) separate from the handling apparatus 37.

In one implementation, the computer 43 may provide or receive information and/or directly communicate to and/or from sensor(s) 39, 39A, 41. The handling apparatus 37 could also collect and communicate data regarding the wear parts being installed and/or removed. The data could include, for example, photos of the wear parts, weight, force required to install/remove, time required to install/remove, notification to personnel of the change out of wear parts, etc. The handling apparatus 37 could further communicate and/or receive data with or from sensors provided in the wear parts. The handling apparatus could provide data to the wear part sensors related, for example, to the change out date, time, location, duration, etc. of replacement of the wear parts. The handling apparatus could also receive data from the wear part sensors related to, for example, wear life, impact, performance, etc. such as disclosed in U.S. Pat. No. 10,011, 975. The sensor data, and/or data from other sources, may be processed by the computer 43 to provide various outputs.

Computer 43 may include instructions for a processor or controller to be configured to receive signals from the sensors 39, 39A, 41, e.g., by wireless transmission containing data, such as the position and/or orientation of the mounting axis 31. The computer 43 may use the data including the detected position and/or orientation of the mounting axis 31 and the relative positions of the crane 47 and joint components 71 to control hydraulic cylinders and/or motors to move the tool head 59 in a straight-line motion along the mounting axis 31 (or other removal motion) regardless of the 3-D orientation of the mounting axis 31. The movement of the gripper 60 along the removal path may be a coordinated, simultaneous motion of the different adjustable components directed by the controller through programmable logic. It could involve a coordinated movement of all the adjustable components, or it could involve adjustment of less than all the adjustable components. The wear member 7 is envisioned to be removed along the defined removal path or axis 31. Other removal paths are also possible. For example, certain wear members (e.g., points and shrouds) may be removed and/or installed along a mounting path that is non-linear (e.g., arcuate).

The term manipulator as used herein refers to an apparatus, device, assembly, sub-assembly or the like for movably supporting a tool(s) for conducting an operation—e.g., removal, installation, inspection, repair, etc. The term manipulator is intended as a general term that may include, e.g., (i) multiple components such as the combination of a base, arm, joint and tool support or head, (ii) a subassembly such as an articulated arm, a joint, and/or tool support, and/or (iii) other assembly or subassembly that movably supports or works with other assemblies or subassemblies to movably support a tool(s) for conducting an operation.

The manipulator 62 may include a crane 47 and a joint 71. In the illustrated example, the crane 47 includes a post 51 rotatable about a first axis A1 oriented vertically, a first arm 53 pivotally secured to the post 51 for movement about a second axis A2 oriented horizontally, and a second arm 55 pivotally secured to the first arm 53 for movement about a third axis A3 also oriented horizontally. The post 51 may be secured to a vehicle 49 that allows for a mobile positioning of the crane 47. The crane 47 may include one or more segments 53, 55 pivotally joined together and controlled by hydraulic cylinders (not shown) but could have other constructions and/or drivers. More or less arms and joint axes are possible. Second arm 55 can optionally be telescoping. The rotation of post 51 is preferably driven by a hydraulic motor, and the pivotal movement of arms 53, 55 by hydraulic cylinders. The crane 47 could optionally also be mounted on a turntable to allow for the rotation about first axis A1. Other kinds of apparatus with different kinds and/or different arrangements of possible movements could be used. One alternative example would be to use the boom 2 and stick 4 of an excavating machine 1 as seen in FIG. 1, and a custom component and/or other assembly.

In one example, tool head 59 is secured to second arm 55 by the joint 71. In the illustrated example, the joint 71 articulates about axis A4. In an alternative, the joint 71 may be adjustable about three perpendicular axes A4-A6 as discussed below. The various adjustments of joint 71 are in one example driven by hydraulic motors. Sensors 41 are, in one example, provided for each adjustment to detect the relative position of each of the arms 53,55 moving about axes A1-A4 in the example shown in FIG. 6 and A1-A6 in the example shown in FIG. 13.

In one example, the manipulator 62 is hydraulically driven to be sufficiently robust in varied environmental conditions such as found in earth working environments, though other drives are possible for certain operations and/or conditions. A hydraulically driven manipulator 62 is less susceptible (e.g., as compared to electric drives) to failure in in-field operations where it may be subject to varied environmental conditions such as heat, cold, precipitation, dirt, fines, dust, smoke, corrosive materials, etc. A hydraulic drive is also able to provide substantial power by compact means (e.g., as compared to electric drives), which is useful for certain applications; one such example includes the removal and/or installation of wear parts in a mining environment, boom structural inspections, any elevated platform applications that would put an individual in harm's way, etc.—though many other uses are possible.

In one example, a manipulator 62 in accordance with the present disclosure can be used with a tool head(s), such as gripper 60 to remove and/or install a ground-engaging wear part 11 from and/or on a bucket (not shown). The manipulator 62 may be used in ways and operations and with tools 59 such as disclosed in U.S. Publication No. 2015/0104075, and/or used in ways and operations and with tools such as disclosed in U.S. Publication 2017/0356167. These are intended as examples as the manipulator 62 could have many other uses. The tool heads can be interchangeably secured to the manipulator to enable different operations as desired and/or multiple tool heads can be concurrently secured to the manipulator 62 to be used cooperatively, independently, simultaneously and/or successively.

The defined path 31 to remove a wear member 7 could optionally also include release motions to better release it from its base before and/or during moving the wear member along its mounting path. Examples of release motions could, for example, include short and/or rapid swinging of the wear member vertically and/or laterally to help release a stuck wear member (such as from the presence of impacted fines) from its base. Use of release motions could occur before or during pulling the wear member 7 along its mounting path. Release motions could be programmed to automatically occur during each removal of a wear member and/or only if the force to remove the wear member exceeds a predetermined limit and/or they could be manually activated. Sensors (not shown) could be provided in the system 35 to detect when a threshold pulling force had been met and release motions should be initiated. Such sensors could also be provided to detect higher than expected forces during installation such as if there is an unexpected mispositioning of the base to receive the replacement wear part such as due to intervening movement of the bucket, a misaligned tooth, etc. Sensors could also be provided to stop movement if the handling apparatus encounters an unexpected barrier. Release motions could also and/or alternatively include float mode as will be discussed further below.

Figure 11:
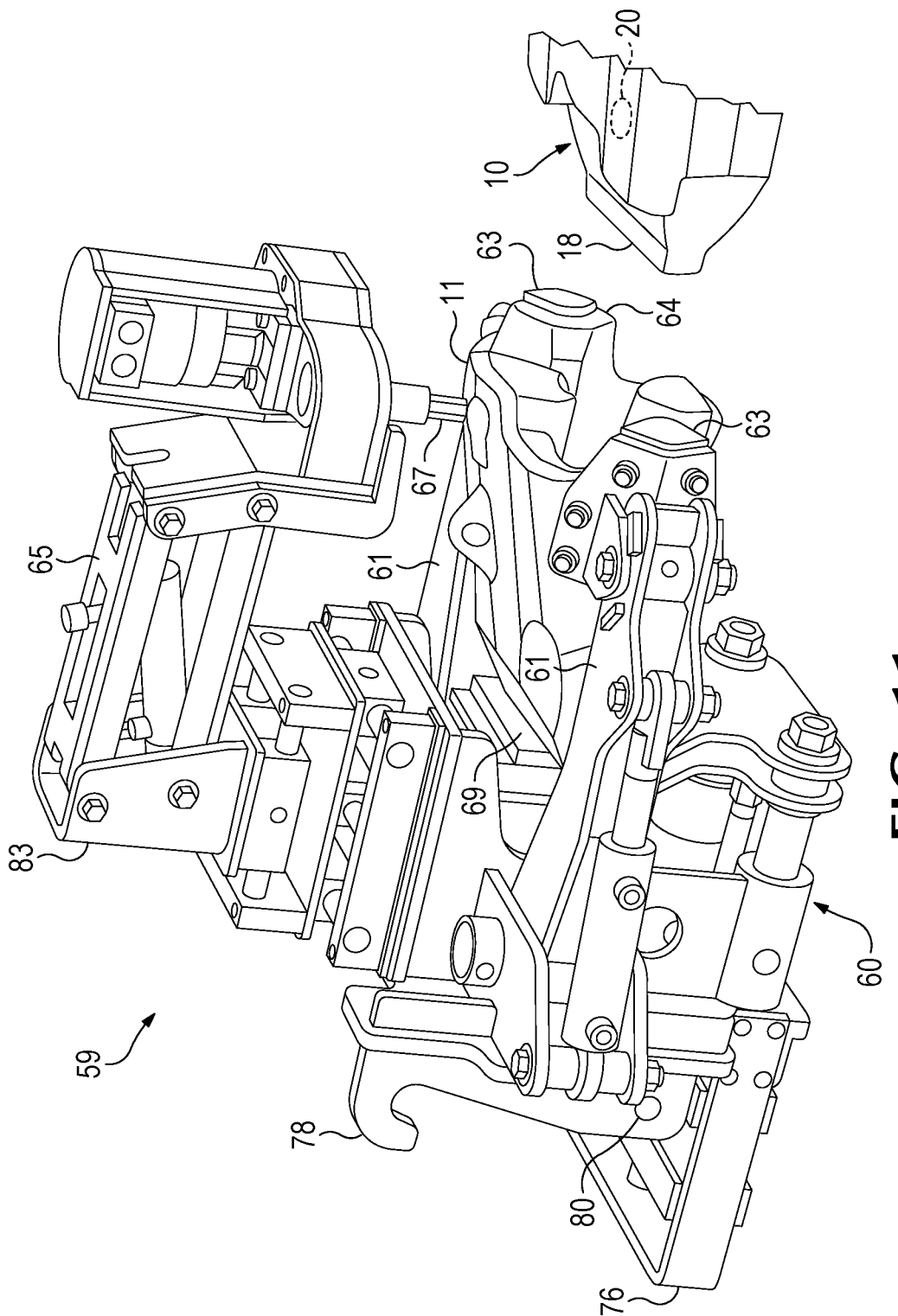
FIG. 11 is a perspective view of a tool head holding a point of the tooth in FIG. 2.
Figure 12:
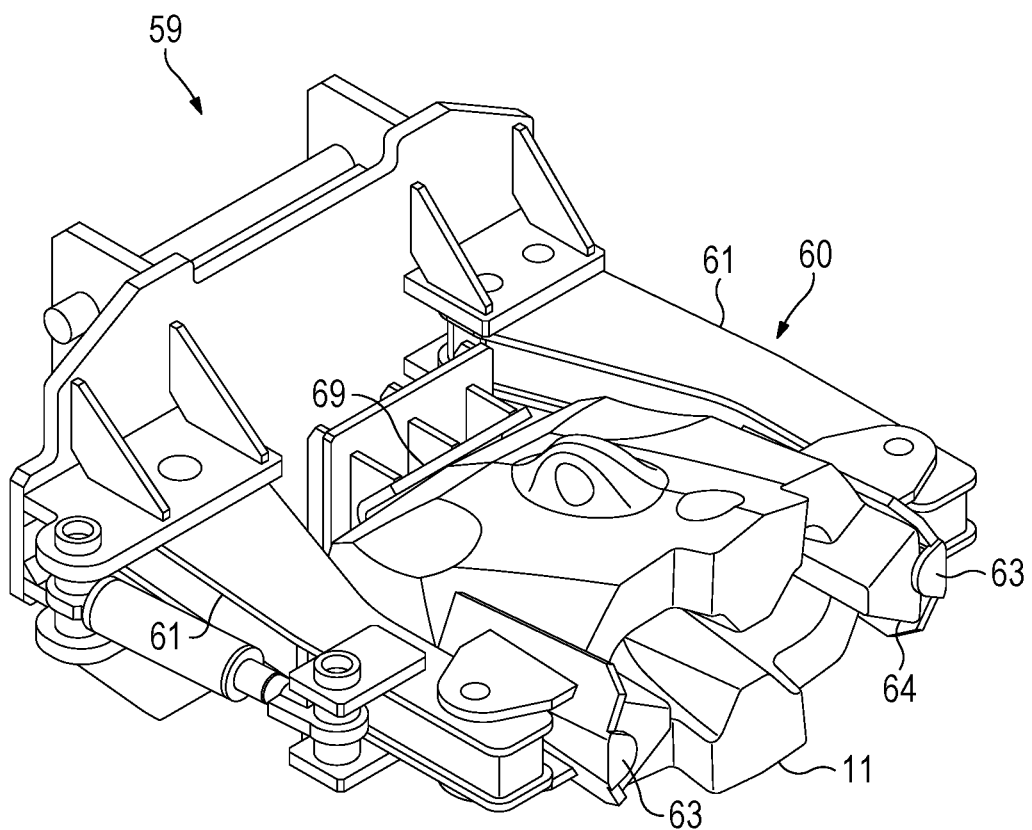
FIG. 12 is a perspective view of another tool head holding a point of the tooth in FIG. 2.

With reference to FIGS. 11-12, in one example, the tool head 59 includes a base tool mount 76 (such has hooks 78) and an operating device (such as a gripper 60). In this illustrated example, tool head 59 has hooks 78 on a rear end to secure tool head 59 to adapter 6 or crane 47, and the operating device 60 on a front end to grip wear member 7. As can be seen, tool head 59 may have a pin 80 for securing hooks 78.

Wear parts 7 (such as points 11) can become stuck on the base on which it is mounted on account of friction, impacted fines, bent components, corrosion and the like. In one example, tool head includes a vibrator, which can cooperate with gripper 60 in removing ground-engaging wear parts 7 from earth working equipment 1. The use of a vibrator in connection with the apparatus for removing the wear parts (e.g., gripper 60) can reduce the force needed to remove the wear part and thereby ease and/or shorten the removal process. For example, in order to remove a point 11, the tool head 59 engages the point 11 mounted on the front nose 18 with a gripper 60 having a pair of opposing arms 61 though other arrangements to hold the wear member are possible. The arms 61 can include inward flanges 63 on their distal ends to engage the rear edges 64 along the sides of points 11. The tool head 59 seen in FIG. 11 includes a driver 65 that is adjustable toward and away from lock 13 to release and/or secure the lock 13. Each driver 65 includes a pivoting arm 83 and a tool 67 (e.g., a hex tool) that is engageable in recess (or other tool-engaging formation) 45 to move pin 29 into or out of engagement with recess 20 in intermediate adapter 10 and/or lock opening 25 in the point 11. This is intended as one example. Other assemblies could be used to release locks 13 and/or other kinds of locks that may be pried, pulled, impacted, etc. out of the wear assembly. The term release in connection with the lock is intended to include adjusting the lock while it remains secured to the wear member and/or removing the lock from the wear member, so the lock no longer secures the wear member to the mount.

In one implementation, to remove the point 11, the arms 61 grip the point with flanges 63 on rear edges 64 with the front end of the point pressed against a stop 69. Drive arm 65 is lowered such that tool 67 is received in recess 45 and rotated to move leading end 21 of pin 29 out of recess 20. The tool 59 in one example is driven by a hydraulic motor. The point 11 is now ready to be pulled from the mount (e.g. front nose 18).

In another implementation, to install a replacement point 11A on the mount (e.g. front nose 18 of the intermediate adapter 10), the handling apparatus 37 grips the replacement point 11A and positions the point 11A adjacent and aligned with the intermediate adapter 10 along a mounting axis 31. The position could be determined by the computer 43 based on data from sensors 39, 39A, 41, and/or memory of the removal process and/or a database, and/or by manual (or semi-manual) control by a worker.

Figure 14:
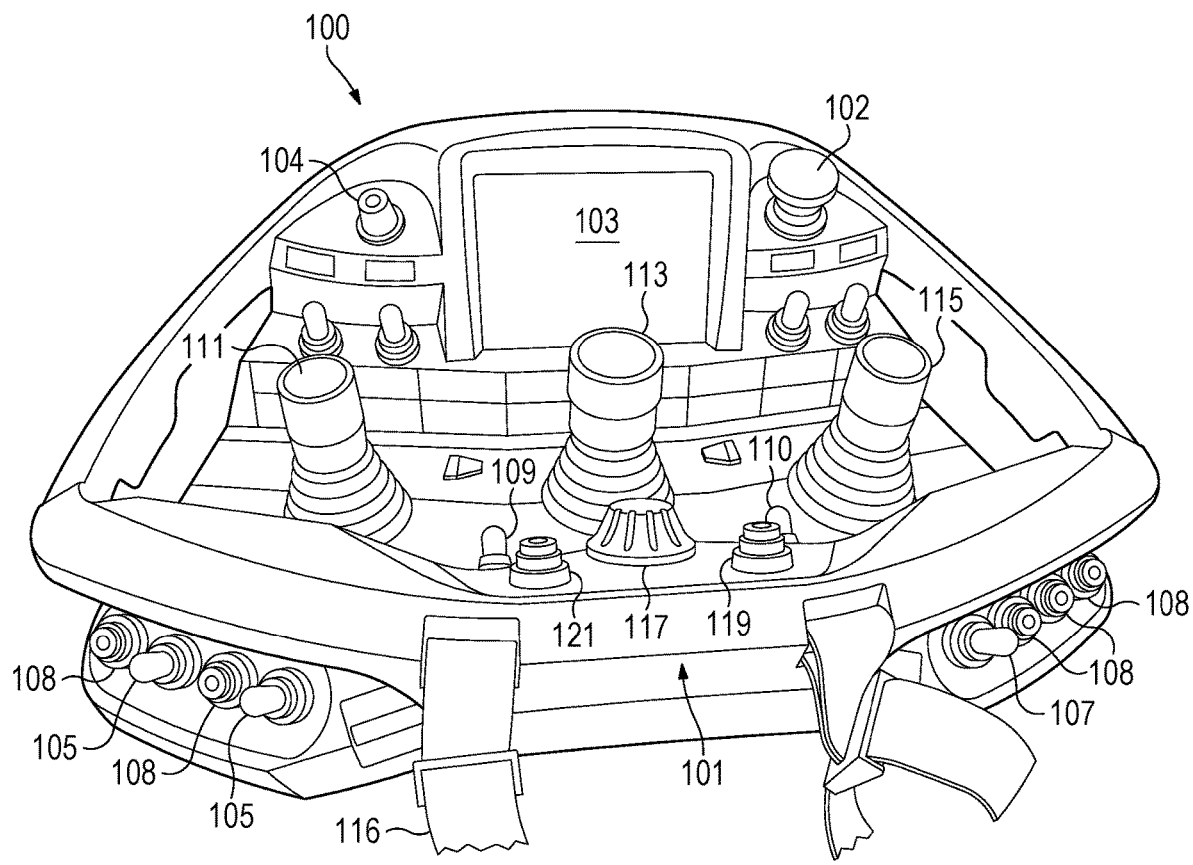
FIG. 14 is a perspective view of a control module for user operation of the handling apparatus.

Control of the handling apparatus 37 may have several modes or controls. FIG. 14 illustrates a handheld or mobile control unit 100 for the handling apparatus 37. The mobile control unit 100 includes a user interface 101, stop switch 102, a display 103, speed control switch 104, toggle switch 105, float mode switch 107, shortcut buttons 108, dead man switches 109, 110, and/or joysticks 111, 113, 115. The control unit 100 may be secured to a post or strapped to a user via strap 116. The display 103 may show different modes of operation for a user to control through the user interface 101. The display may show the percentage of full extension of a particular component of the handling apparatus 37 (e.g. second arm 55).

The user interface 101 includes a rotary button 117, enter button 119, and esc button 121. The rotary button 117 allows the user to orient to select a particular function (e.g. mode of operation). The enter button 119 allows for the acceptance of the selection and the esc button 121 allows for the return of the selection to a previous screen or cancel selection. The user interface 101 may also be a touch screen display to allow the user to select various functions or modes for the handling apparatus 37 through haptic feedback with the display 103.

For example, one mode may be for control over the crane 47. As an example, the joystick 111 (or other controller) may control the operation of the crane 47 only. A second mode may be for control over the three-axis joint assembly 71, 71A. The handheld control unit 100 may include a second joystick 113 (or other controller) that controls the operation of the joint assembly 71, 71A only. A third mode may be for collective control over the crane and the joint. The control may include a third joystick 115 that controls the combined operation of the crane and the joint.

In this example, a forward pushing of the first joystick 111 would cause the crane hydraulic cylinders to jointly move to coordinate a straight-line (or other) motion of the end of the crane 47 (i.e., at 41). A rearward pushing would be in the reverse direction, a right sideways pushing on the first joystick 111 would move the end of the crane in a right direction, etc. A forward pushing on the second joystick 113 would move the joint to tip the tool head downward. A sideways pushing of the second joystick 113 would cause the joint to turn the tool head to the right. A forward pushing on the third joystick 115 would control the crane 47 and the joint assembly 71, 71A to move the tool head directly forward in a straight-line motion (or other motion if programmed to be a different motion). This is the control that would preferably be done to pull a wear member from a base and/or to install a wear member onto a base.

In the removal example, the tool head would grip the wear member 7 and release the lock(s). Then, the third joystick 115 would be moved rearward for the handling apparatus to automatically move the wear member in a reverse motion along the removal path 31, which in the illustrated example is a straight-line motion. To install a replacement wear member 7A, operation of any or a plurality of the joysticks 111, 113, 115 moves the wear member 7A to be aligned with base. The third joystick 115 can then be pushed forward for the computer to cooperate with sensors 41 and control the hydraulic cylinders and/or motors to move the tool head with the replacement wear member 7A along the mounting path 31 (e.g., in a straight-line movement) to place the wear member fully on the base. The tool head is then operated to move (or install) the locks to the hold position to secure the wear member to the base. The wear member can be released, and the handling apparatus removed. The tool head controls can be separate (and optionally on the handheld control) from the crane/joint controls. Other embodiments are possible, and a full automated process is possible. While a control with joysticks is shown, other arrangements are possible. For example, a single joystick operable in the different modes could be used. As another example, the joysticks could be replaced with other kinds of controllers.

In another example, one mode controls the crane 47 and the three-axis joint to move. The joystick 111 may control the post 51 or slew or swing rotation (e.g. by left/right rotation of the joystick 111) and the main boom or arm 53 up and down movement (e.g. by up/down or right/left movement of the joystick 111). The joystick 113 may control the three-axis joint assembly 71A, such that each direction, up/down, left/right, and rotate left/right controls a specific axis (e.g. pitch, roll, yaw) on the three-axis joint assembly 71A. The joystick 115 may control the inner and outer booms. For example, left/right movement control the inner boom extension and retraction and up/down movement control the outer boom or arm 55.

In another implementation, toggle switch 105 switches between several modes that control different tool heads, for example an adapter installation/removal tool or a point installation/removal head or gripper 60 (FIG. 11). In such a mode, the joystick 111 may control the adapter stabilizer to move in and out with an up/down movement of the joystick 111. The joystick 111 may also control the gripper arms 61 moving inward and outward with movement of the joystick 111 (e.g. left/right movement). The joystick 113 may move the drive tool 67 up and down and rotates the tool clockwise and counterclockwise (e.g. through the up/down and left/right movement). The joystick 115 may move the drive tool 67 forward and backward and left to right to align with a lock. In one example, the dead man switch 109 may be required to be pressed while pressing the toggle switch 105, such that there is an intended purposeful switch between modes. In another implementation float mode switch 107 may activate a float mode of the three-axis joint assembly 71A during the tool head mode. The float mode switch 107 may also be toggled on/off during the crane solo mode and the crane and three-axis joint assembly mode. The float mode activation may further determine which axis is floated (e.g. A4, A5, A6, or some combination) as will be further discussed below. The dead man switch 110 may be required to be pressed when pressing the float mode switch 107, such that there is an intended purpose to switch on the float mode.

In another example, the toggle switch 105 may select the mode for mounting axis control of both crane 47 and joint assembly 71, 71A. Such a mounting axis mode may, e.g., be a linear motion mode. In this case the mounting axis 31 is determined or set by the operator by maneuvering the handling apparatus adjacent the wear member to be replace or installed. Once the mounting path 31 is determined, then the joysticks 111, 113, 115 may be used such that control of both the crane 47 and the three-axis joint assembly is controlled concurrently. For example, joystick 111 may control the x-y directional movement along the path 31, while joystick 115 may control the z direction (e.g. fore and aft). It should be noted that three-axis joint assembly 71, 71A may be pitched, rolled, yawed in any number of directions, and the joysticks 111 and 115 will still control both crane 47 and three-axis joint assembly 71 to move along the path 31. Joystick 113 may still be used to control the three-axis joint assembly solely even during the mounting axis or linear motion mode.

In one implementation, the speed control switch 104 may control the speed in which the crane 47 and the joint components move. In one example, the stop switch 102 may stop all actions from being performed until the stop switch 102 is deactivated. This may account for any missteps during the in-field operation.

In another implementation, shortcut buttons 108 may allow swapping for functions to be performed in other modes outside of the current selected mode. For example, in the crane 47 only mode, shortcut button 108 may be pressed to clamp the arms of a gripper head tool or extend/retract the stabilizer on a gripper head tool. This would alleviate the need for the user to swap between modes and have some shortcut to a particular function to be employed no matter what mode the handheld unit 100 was in.

Regardless of whether joysticks or other forms of control are used, one example mode of operation controls the orientation and position of the crane 47, the manipulator 62, the three-axis joint assembly 71A, and the tool head 59 simultaneously such that the tool 59 holding the wear member moves along a single mounting path 31, which in this example is along a linear mounting axis. Once the replacement point 11A is aligned with the base or adapter, the computer 43 moves the point 11A forward in a straight-line or other defined motion along the mounting axis or other mounting path 31 to mount the point 11A on the intermediate adapter 10. A freedom of motion adjustment, known as "compliance", provided by springs (or other means, such as floating discussed below) could be used to install the point on the mount (e.g. intermediate adapter 10) to alleviate the need to move strictly along the designated or defined path and/or be precisely aligned with the mounting path of the mount (e.g. front nose 18 of the intermediate adapter 10). The freedom of motion provided by springs or the like (if provided) would generally be locked (at least part of the time) and not usable during removal because of the amount of force at times needed to remove the point from the front nose 18 of the intermediate adapter 10.

Referring back to FIG. 6, to ease the operation of removing and installing wear members 7/7A (such as points 11, 11A, or 24), the computer 43 having a processor using programmable logic can automate the movements of the apparatus 37. During replacement of a wear member 11A, the worn wear member 7 is replaced and discarded in a bin or other stowage location 75.

New wear parts 7A can be provided on vehicle 49 by a rack, stowage location, or a carousel 77. A replacement wear member 7A is gripped at a stowage location 77 and installed on the mount (e.g. base adapter 9, intermediate adapter 10, lip 16, or other mounting site) where the worn wear member 7 was removed. The carousel 77 can include several compartments that hold the individual wear parts 7A to be installed. The carousel 77 can be controlled by a computer and rotate to indexed positions. When the apparatus 37 pulls a replacement wear part 7A (e.g. point 11A) from the carousel 77 for installation, the carousel 77 can rotate to an indexed position to present the next new wear part 7A in the same position as the previous wear part 7A. This allows the apparatus 37 to store in memory and access the same position each time to pull another part. The carousel 77 can have one layer or can have multiple storage layers with more than one indexed position. Alternatively, the carousel 77 can present an empty bin at the indexed position and the apparatus 37 can place a used worn wear part 7 removed from the earth working equipment 1 in the empty bin 75. The carousel 77 can then rotate to present a new wear part 7A which the apparatus 37 can pull for installation. Alternatively, the apparatus 37 can place used wear parts 7 in the bin 75, such as the one on the vehicle 49. At the end of an installation job the bin 75 can be dumped to recycle the used parts. The carousal 77 could also include a library for different tool heads that could be similarly configured for dispensing the tool heads at indexed positions. Alternatively, a carousel 77 can dispense both wear parts 7A and tool heads.

In one example, the computer 43 may include instructions for a processor or controller to be configured to move the worn wear member 7 pulled from a base or mount (e.g., along the mounting axis 31) to be discarded in a bin or other stowage location 75. The controller using programmable logic then grips (or otherwise secures) a replacement wear member 7A for installation on the base or mount where the worn wear member 7 was removed. The controller can store the path 31 and the location where the worn wear member 7 was pulled from the mount (e.g. intermediate adapter 10) and can recall (without returning to the discard bin 75) by programmable logic the previous movement to align the replacement wear member 7A with the mounting axis 31 for installation on the base or mount. The controller can then use programmable logic to move the wear member 7A onto the base 9, intermediate adapter 10, lip 16 or other mounting site. The controller could also autonomously by programmable logic or manually by user control (with or without programmable logic) move the gripper 60 to the next wear member 7 to be removed. Also, as an alternative, the controller may be configured to have a learn mode, wherein the controller learns the path of operation by an operator manually moving the handling apparatus through a repeated course or repeated in the field, and then the learn mode can be called to replicate the same motions or slightly adjusted motions for the next worn part.

The disclosed use and construction of handling apparatus 37 and tool head 59 is but one example and other arrangements are possible. The handling apparatus 37 could have different forms and/or have fewer or more different freedoms of motion.

With reference to FIG. 13, manipulator 62 can include a three-axis joint assembly 71A (as one example of joint 71) to secure tool head 59 to manipulator 62. Joint assembly 71A can have a construction as disclosed in U.S. patent application Ser. No. 16/370,868 filed Mar. 29, 2019, which is herein incorporated by reference in its entirety. The three-axis joint assembly 71A may be situated at the far or distal end of the second arm 55. The tool head 59 may be removably secured to the far end 70 of the three-axis joint assembly 71A.

The three-axis joint assembly 71A may include a base 14 and an adapter 6. The adapter 6 could mount a plurality of different tools heads 59 secured together in series or could successively support different tool heads 59. The base 14 is preferably secured to the distal end 71 of arm 55, which in this example terminates in a base plate 30. The base plate 30 can be fixed in a single orientation to arm 53 or include a joint to provide a pivotal, universal or other connection. In one example, base 14 includes movable components in close proximity to define three axes A4, A5, A6 for compound movement of the supported tool(s), such as tool head 59. Joint components or articulators are secured together to form three points of articulation or axes (or more or less than three). In one example, one axis always intersects the other two axes. Alternatively, the three-axis joint assembly 71A could be constructed so that the three axes intersect at all times. Alternatively, the three-axis joint assembly 71A could be constructed so that two of the three axes intersect at all times. In another example, none of the axes A4, A5, A6 intersect. In one construction, the axes A4-A6 are in close juxtaposition to facilitate a controlled motion in a compact space.

Base 14 is secured to the distal end of arm 55 by a first support 28. The first support 28 in this example includes spaced securing plates 32 that are attached (e.g., by bolting) to base plate 30. In the illustrated example, the axes A4-A6 are oriented successively from distal end as a pitch axis A4, a yaw axis A5 and a roll axis A6, though they could be oriented in a different order.

In the illustrated example, base 14 includes a first actuator 34 for movement about the pitch axis A4. The first actuator 34 includes a casing 36 secured to securing plates 32, and a first internal rotatable element (not shown) attached to and movably holding a second support 38. Second support 38 includes a pair of arms 40 that extend around opposite ends of casing 36 to attach to the first internal rotatable element, a base plate 42, and securing plates 44 for holding a second actuator 46. The first actuator 34 is, in this example, may be a hydraulic rotary actuator such as is available from Parker-Helac Corporation. In this example, the actuator 34 provides movement about the pitch axis A4 of about 100°. The first or pitch actuator 34, in this example, provides a freedom of motion that ranges from −10° to +90° from neutral, which in this case is when base plate 42 is parallel to base plate 30. Other drivers, constructions and freedom of motion are possible.

The second or yaw actuator 46 is, in this example, may be a hydraulic rotary actuator such as is available from Parker-Helac Corporation. Second actuator 46 includes a casing 48 secured to securing plates 44, and a second internal rotating element (not shown) attached to and movably supporting a third support 66. In this example, third support 66 includes arms 52 secured to the second internal rotating element, and a base plate 54 supporting a fourth support 50. In this example, the second or yaw actuator 46 provides movement about the second or yaw axis A5 of about 160°. In this example, actuator 46 provides a freedom of motion that ranges from −80° to +80° from neutral, which in this case is when the base plate 55 of support 50 is parallel to base plate 42. Other drivers, constructions and freedom of motion are possible.

The third or roll actuator 56 is, in this example, a hydraulic cylinder supported by a fourth support 50 for moving a turntable 57. In this example, the roll actuator 56 provides movement about the roll axis A6 of about 40°. In this example, the actuator 56 provides a freedom of motion that ranges from −20° to +20° from neutral, which in this case is when the adapter legs 85 extend downward for setting on the ground or other support when not in use. In one example, the roll axis A6 intersects the other two axes A4, A5 at all times, i.e., in all orientations. Other drivers, constructions and freedom of motion are possible. In an alternative construction, the yaw actuator 46 is shifted rearward to overlie the pitch joint such that the pitch and yaw axes A4, A5 always intersect. In this arrangement, the roll axis A6 also preferably intersects the other two axes A4, A5 such that all three axes intersect at all times (not shown). In another configuration, none of the axes A4, A5, A6 intersect.

Adapter 6 includes a tool mount 70, which in this example is on the front end 80 opposite turntable 57. The tool mount 70 may include a connector to secure the tool head to the tool mount 70. In this example, tool mount 70 includes a pin 64 and a supporting plate 65 to which a tool, such as tool head 59, is secured. In one example, the tool head 59 is a gripper assembly 60 that holds wear parts 7 (such as points 11) when installing or removing them onto or off of earth working equipment 1. However, other kinds of tool heads and mounts could be used to accommodate tools with different kinds of connections. In one embodiment, other tool heads could be secured in a series. As one example, a tool head in the form of a sensor module could be mounted in series with tool head 59. As examples, the sensor module could detect one or more of the applied pulling force to remove the wear part, the level of applied vibration, signals from sensors in the wear parts, and/or other characteristics of the operation. The sensor module could include a connector in the form of hooks 78, though other arrangements are possible. Each tool head could be operated when needed, continuously, when certain events occur, etc. depending on what is needed or desired. Other tool heads including, for example, one or more sprayers for cleaning out fines, welding equipment, cameras, etc. could be secured in a series from adapter 6. The various tools can be secured and removed as needed for the desired operation. Although tool mounts and hooks are illustrated, other securing arrangements are possible. Additionally, though examples with two or three tools in a series have been discussed other numbers of tools could be secured together.

Additionally, adapter 6 can be provided with various means to attach different kinds of tools, e.g., with holes to permit bolting and/or other common or custom connection devices. Different adapters could also be secured to base 14 to accommodate different tools and/or operations.

Couplers 68 can be secured to adapter 6 outboard of adapter housing 72 to facilitate hydraulic, pneumatic and/or electrical connection to the tool(s), i.e., to drive and/or control the various mechanisms and operations the tool(s). They could be otherwise secured. In this example, two six port hydraulic couplers 68 are included to provide an easy and quick hydraulic source for the tool(s); other arrangements are possible. Electrical connectors (not shown) can also be provided for use by the tool(s).

In one example, the arm 55 and joint assembly 71A are operated together by the same control whether manual, automatic or semi-automatic. For example, operation of joint assembly 71A can be joined with the operation of the crane 47 or other base manipulator so they work together. In such cases, the three-axis joint assembly 71A can include a computer 43 and a multi-valve manifold 73 to operate the supported tool head(s) 59 through couplers 68. In an alternative example, arms 53, 55 can be operated by the controls of the crane 47 or other manipulator, and a separate computer 43 and manifold 73 are used to operate actuators 34, 46 and 56, and the supported tool head(s). Such independence enables the joint assembly 71A to be secured to virtually any crane, stick, arm or other support without a need for incorporation of the controls into crane, stick, arm, etc.

In other alternatives, the crane 47, joint assembly 71A, and tool head(s) 59 could each have separate computers, or all be operated by a single host computer 43. Hoses and/or internal ducts provide hydraulic fluid or the like from a source to the components of manipulator 62, joint assembly 71A, and/or the supported tool(s). The hoses and/or ducts are omitted from the drawings; they could have virtually any arrangement. Similarly, electrical lines may be provided to manipulator 62, joint assembly 71A and/or the supported tool(s). The electrical lines are also not shown in the drawings. The computer 43 could be powered by an electrical source from a crane, excavator, vehicle, power unit, etc. and/or by a battery in the adapter or elsewhere. A battery may be provided in addition to or in lieu of such electrical lines. Hydraulic fluid (and electrical power if needed) for the joint assembly 71A and/or tool(s) can be supplied by a crane, excavator, vehicle, or other device supporting the joint, or from a separate drive unit(s). The computer 43 could be located remote from the handling apparatus.

The computer 43 may include instructions for a processor or controller to be configured to direct the actions of the crane 47, three-axis joint 71A and/or supported tool head(s) 59. The computer 43 may have a processor with instructions configured to receive signals from another computer, handheld, or mobile device to conduct real-time operations—for example, operations of removal, installation, inspection, repair, refueling, tree trimming, harvesting, etc. The computer 43 may be included in a mobile and/or handheld device having a joystick(s) or other kind of controls to control and operate the crane 47, three-axis joint 71A and/or tool head(s) 59. Alternatively, the instructions from the computer 43 may provide directions for an automatic or semi-automatic operation by the crane 47, three-axis joint 71A and/or tool head(s) 59. In such a system, the instructions for the automated operations are preferably pre-stored in a database (remote or in the adapter 6) and used to carry out the desired operation(s). In an automated operation, the crane 47, three-axis joint 71A and/or tool head(s) 59 can be provided with encoders (linear or rotary) and/or position sensors at the actuators 34, 46, 56 to identify their positions and/or orientations. Automated and manual controls may work together cooperatively, successively or separately. Signals may alternatively or additionally be received from sensors contained in the components and/or equipment to be removed, installed, inspected, etc. to, e.g., identify the component(s) and/or equipment, guide crane 47, the three-axis joint 71A and/or tool head(s) 59, or communicate other information about the position, condition or operation of the wear component 7 and/or equipment. Examples of sensors that could be included are disclosed in U.S. Pat. Nos. 9,670,649, 10,011,975, and/or U.S. Publication No. 2016/0237640. Signals may be received from other cranes, three-axis joints and/or tool heads working near or in cooperation with the crane 47, three-axis joint 71A and/or tool head(s) 59. Any or all of such signals in the various examples may be collectively used together or be available for use together. Alternatively, they may each be used on their own or in various combinations with others of the kinds of signals and operations. Further, whether they are used together or on their own, they may be received in combination with other kinds of signals. The communication device may also or alternatively transmit signals for a variety of purposes including any or all of those noted above. The transmitted signals may be any of a variety of different kinds, with radio waves being one example.

In one example, the handling apparatus 37 may be used to inspect and/or replace a wear part on an excavating bucket. A camera or other tool could be coupled to, e.g., adapter 6 to conduct an inspection of the condition of the wear parts. A tool such as the illustrated tool head 59 could be used to replace the wear part. The camera or other inspection tool could be provided as part of tool head 59, could be a tool separately attached to adapter 6, or could be secured to adapter 6 in lieu of the illustrated tool head 59 for the inspection.

The manipulator 62 and/or tool head(s) 59 may be fully manually controlled by a processor having instructions stored in memory to grip, release the lock, and remove the wear part. Alternatively, a computer 43 may manually adjust the manipulator to place the tool in proximity or engagement with the wear member, and a programmed sequence of instructions are used to operate the manipulator and/or tool to carry out one or more of gripping the wear member, releasing the lock and/or removing the wear member. Alternatively, the entire operation may be controlled by a sequence of programmed instructions. Cameras and/or sensors may be used in manual, automatic and/or semi-automatic operations. The computer 43 may receive information from such camera (or the like) and/or sensors, and/or sensors in the wear members or equipment supporting the wear members. As an example, the computer 43 may receive information to identify the type of wear members 7 installed on the bucket, the position of the wear member 7 on the bucket 3, the orientation of the wear member 7, the condition of the wear member 7, etc.

A freedom of motion adjustment, known as "compliance" or "float" may be provided by float control manifolds 81, 82 (or other means). Floating or float removes control from the operator and may allow or direct fluid (by means of a barrier or valve) to flow freely or exchange from one side of a hydraulic actuator to the other through a passageway (e.g. within the actuator or within a float control manifold). The direction of the flow through the passageway being affected by an external acting force, such as contact with a wear member 7 or mount (e.g. intermediate adapter 10). The float adjustment could be used, e.g., when installing the point 11 on the mount (e.g. front nose 18 of the intermediate adapter 10) or when initially gripping the point 11 during removal to alleviate the need to move strictly along the designated or defined path 31 and/or be precisely aligned with the mounting/removal path 31. The float adjustment may be automated and/or controlled by the computer 43. The float mode or adjustment may be initiated in a number of different ways including float for one or more of the actuators in the crane, joint and/or tool head. As examples: floating all three actuators 34, 46, 56 of three-axis joint assembly 71A about their respective axis A4, A5, A6; floating two of the three actuators 34, 46, 56 about their respective axis A4, A5, A6; floating one of the three actuators 34, 46, 56 about their respective axis A4, A5, A6; floating none of the three actuators 34, 46, 56 about their respective axis A4, A5, A6, while floating one or more of the crane arm joints about their respective axis A1, A2, A3 or some combination thereof.

In the illustrated example, actuator 34 is able to float about axis A4 and actuator 46 is able to float about axis A5, while axis A6 is controlled (e.g. two axes are in float mode).

This arrangement allows for minor or minute adjustments along axes A4, A5 during a mounting path install or removal. The manipulator 62 moves the tool head 59 along axis A6 while the float can provide selected, minor movements to help align the tool (if slightly misaligned) with the removal/installation path along axes A4 and/or A5, such that the tool head can more easily remove and/or install the wear member on the mount. The three-axis joint assembly 71A may include float control manifolds 81, 82 and/or an alert 84.

The float control manifolds 81, 82 engage or disengage a float mode (e.g. direct a barrier or valve to engage and block a passageway or disengage and allow fluid flow through a passageway) for the three-axis joint assembly 71A. In float mode, the three-axis joint assembly 71A may still be adjusted by the joint actuators and/or by the manipulator while at least one actuator controlling the joint components for movement about axis A4 and/or A5 are in float mode. The float mode effectively turns off control (e.g. neutral state) for that actuator such that other external forces can play into an alignment with either attachment to a wear part or attachment to a mount. Such maneuvers may need a smaller incremental adjustment than would be attainable through the control of the joint and/or manipulator alone. The float can be manually activated and/or automatically such as for a short duration when the forces exceed a predetermined level.

The alert 84 (if included) activates whenever the float mode is activated. The alert 84 may be, for example, a visual alert, haptic feedback, and/or an audio alert. In one example, the alert 84 may be activated by an electrical switch. Alternatively, the alert 84 may activate a radio transmitter to generate a notification or alarm. The example illustrated shows the alert 84 on one of the arms 52 secured to the second internal rotating element being a light capable of being visible to an operator of the handling apparatus 37 and/or the earth working machine 1 nearby. The apparatus 37 may wirelessly provide the alert 84 to equipment operators or others, and/or handheld or wireless devices for access by the operator or others. In addition, the programmable logic may be programmed to produce the alert 84 if the programmable logic determines that a float mode is necessary or controls the apparatus 37 into a float function.

Figure 16B:
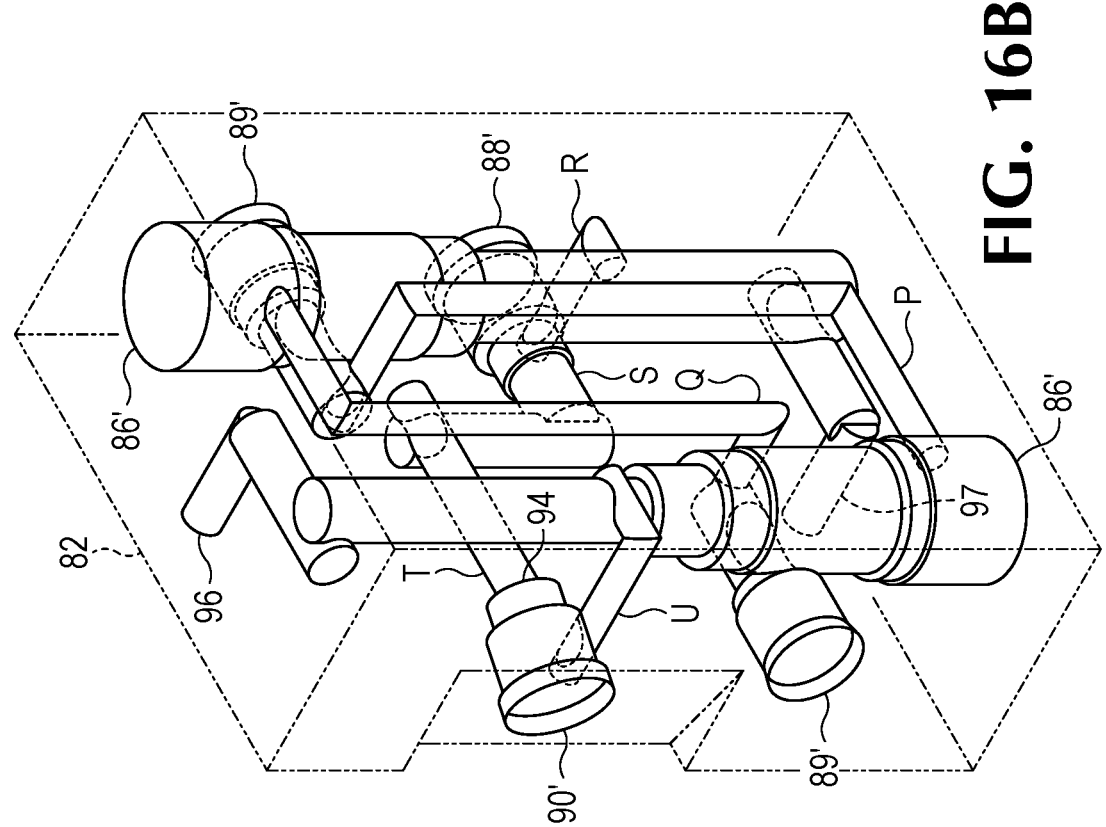
FIG. 16B is a perspective view of fluid pathways with the casing of the float control manifold of FIG. 16A shown in phantom.
Figure 16A:
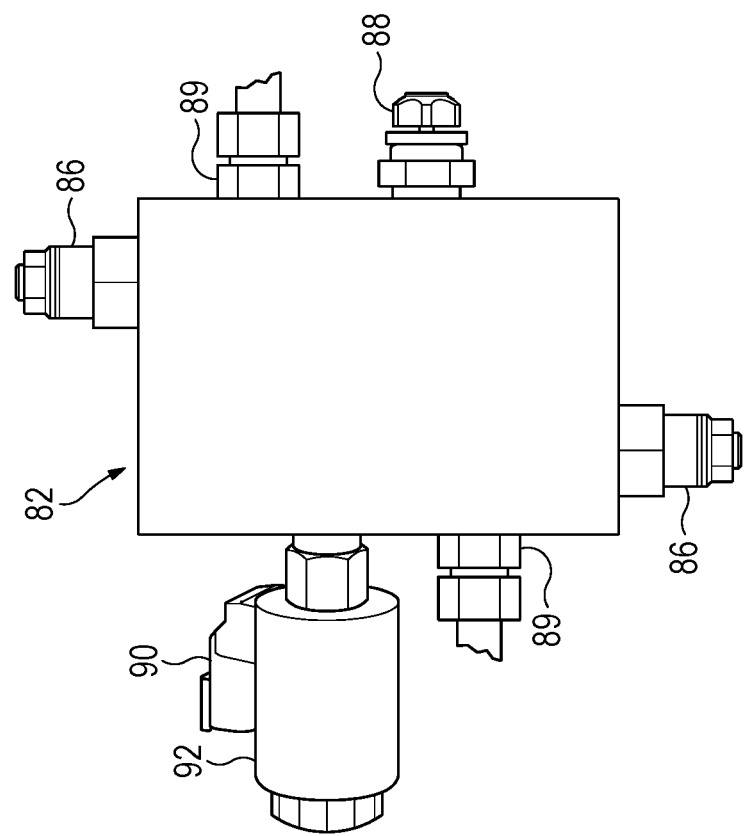
FIG. 16A is a side view of another float control manifold.

With regard to FIGS. 15A and 16A, the float control manifolds 81, 82 may, in one example, include counterbalance valves 86, a bent arm pipe 87, a needle valve 88, input values 89, and a float mode assembly 90. The actuators 34, 46, 56 each have input ports 96, 97, that are inlets to each side of the actuator to control for example, a piston, a rotary device, or the like. Each of the components of the float control manifolds 81, 82 may be fluidly connected as will be further discussed below.

The counterbalance valves 86 maintain the fluid pressure within the manifold when there is no direct fluid pressure being introduced, e.g. the system 35 has stopped at a particular position. The needle valve 88 may be adjustable and act like a flow control valve, in which a flow of a fluid (e.g. hydraulic fluid) is dampened in two different directions. The needle valve 88 is adjustable by penetrating a needle into or away from the connection between passage R and passage T in FIG. 15B and R, S, and T in FIG. 16B. The smaller the allowance allowed by the needle in the needle valve 88, then the smaller the increments of movement that the actuator 34, 46, 56 moves along the respective axis A4-A6. The needle valve 88 truncates passages R, T for the flow of hydraulics that move the actuator 34, 46, 56 in either direction in FIG. 15B. The needle valve 88 truncates passages R, S, T in either direction in FIG. 16B. In one example, those directions dictate which direction the hydraulic rotary actuator spins. Alternatively, the needle controls which direction a piston moves in a piston actuator. The truncation of the passage from the needle affects how much fluid is allowed through (e.g. dampens), and therefore affects the amount the actuator 34, 46, 56 is moved. Alternatively, the needle valve 88 may also be fixed. In another example, the needle valve may control the amount of float allowed (e.g. 1-2 degrees).

The float mode assembly 90 includes a motor 92 and a barrier 94. The float mode assembly 90 may be situated at least partially within the float manifold 81, 82 or attached separately as a stand-alone device. The motor 92, which may, for example, be a solenoid or a DC motor controls the position of the barrier 94 (e.g. engaged to block or disengaged to open). Pathway or passages S, T, U create a channel between the two input valves 96, 97 of the actuator and the barrier 94 blocks or opens the channel in FIG. 15B. The input valves of the hydraulic actuator controlling the direction along a specific axis of the manipulator. Pathway R, S, T, U create the channel between the two input valves 96, 97 of the actuator in FIG. 16B. If the barrier 94 is in a closed position, the channel is blocked, and the float mode is off. If the barrier 94 is open, then the channel is open allowing fluid to exchange and move between both ports 96, 97 freely, and the float mode is on. The float mode assembly 90 creates the float function, in that at least one of the actuator 34, 36, 56, and crane 47 will move, for example, about −2.5 to 2.5 degrees about the respective axis A4, A5, A6 from an external source or force. The external source, in the illustrated embodiment, is the wear part secured to the earth working equipment or mount on the earth working equipment. These small degree movements enable the tool head 59 to make small incremental movements that may not be available to the handling apparatus 37 during complex movement operation. These small movements allow for installation and removal of low tolerance parts, where the tolerances make for a tight fit. These small movements also account for small variances in the install and removal process where the apparatus 37 has the tool 59 is slightly off either the mounting axis 31 or the front of the worn product. In one example, the manipulator may be controlled while the joint is in float mode. The float mode is beneficial on account of the preferred hydraulic drive, which is powerful and robust in an earth working operation. While electric motors would provide the needed precision, they would not withstand the rigors generally found in a mine, construction site or other earth working operation.

With reference to FIGS. 15B and 16B, the fluid passages P, Q, shown may not completely intersect with apertures 86', 87', 88', 89', 90' that the components of the float manifolds 81, 82 attach therein and only a portion of the passages may intersect. The counterbalance valves apertures 86' are connected to one another by means of passages P and Q. The passage Q connects input aperture 89' to the counterbalance aperture 86' opposite the input aperture 89'. The passage P connects the counterbalance valves apertures 86' together. The input valve apertures 89' may intersect with counterbalance valve apertures 86'.

One of the counterbalance apertures 86' may connect with the bent arm valve aperture 87'. The float valve aperture 90' may connect with the bent arm valve aperture 87' through passage U in FIG. 15B. The float valve 90' may connect to the input valve aperture 89' through passage U in FIG. 16B. The float valve aperture 90' may connect with the needle valve aperture 88' through passage T in FIG. 15B and through passage S, T in FIG. 16B. The needle valve aperture 88' may connect with the other counterbalance valve aperture 86' through passage R. Passage R may connect with passage S. Passage S may connect with the input valve 96 of the actuator 34 as shown in FIG. 15B. Other constructions for the float control are possible.

A manipulator 62 and/or tool head(s) 59 as disclosed herein may be used to remove and/or install wear parts from and/or on equipment in mining, construction, dredge, mineral processing, and/or other earth working operations. As examples, the earth working equipment can include various machines (e.g., excavators, cable shovels, shearers, continuous miners, crushers, etc.) and/or conveying equipment (e.g., chutes, conveyors, truck trays, etc.). The wear parts 7 can include, e.g., points, adapters, picks, shrouds, runners, wear plate, track components, blades, etc. The above descriptions of system 35 in a mining environment (e.g., to replace wear parts) are provided as examples of possible constructions, operations and uses of the manipulators. Systems 35 in accordance with the disclosure can have many other uses.

Figure 17:
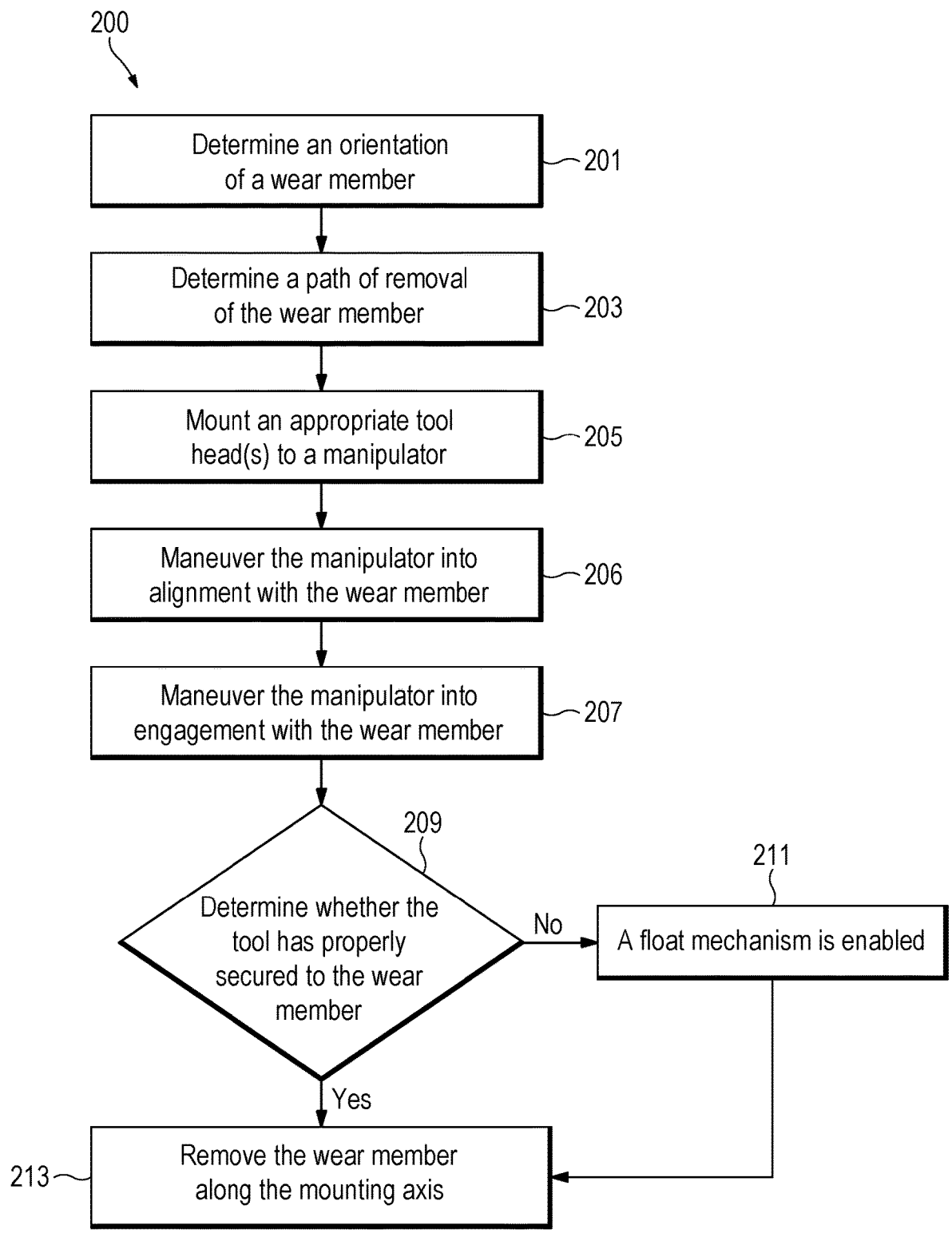
FIG. 17 is an example process of removing a wear component.

FIG. 17 illustrates an example method or process or program 200 for removing a worn wear component from an earth working machine. Process 200 may be implemented in program instructions in the context of any of the software applications, modules, components, or other such programming elements deployed in a computer 43. The program instructions can direct the underlying physical or virtual computing system or systems to operate as follows, referring parenthetically to the steps in FIG. 17. The various steps may also be conducted through manual and/or semi-automated controls. The various steps may be conducted in a different order and/or include more or less steps.

To begin, in one example, the position and/or orientation of the worn wear member is determined (Step 201). This determination can be accomplished, e.g., by sensors 39, 39A, 41 in association with programmable logic and/or manually directed placement. In another example, cameras may aid in the determination. From the position and/or orientation, a mounting path or axis 31 can be determined (Step 203) by computer 43. The mounting path 31 is the path in which the wear member should travel to be removed from and/or installed on the mount. The mounting path 31 may optionally be manually set by an operator aligning the gripper of the tool head with the wear member to be removed. The handling apparatus 37 may have several modes. One mode may be for specific control over the crane 47. Another mode controls the crane 47, the three-axis joint 71A simultaneously such that the apparatus 37 moves the wear member along a single mounting axis 31. The computer 43 may use the data from sensors 41 including the detected orientation of the mounting axis 31 and the relative positions of the crane 47 and joint components 71 to control hydraulic cylinders and motors to move the tool head 59 in a straight-line motion along the mounting axis 31 regardless of the 3-D orientation of the mounting axis 31. The appropriate tool head(s) 59 is selected and mounted to the manipulator 62 (Step 205); this could be the first step. The manipulator is maneuvered into alignment with the wear member (Step 206). The handling apparatus 37 is maneuvered to engage the wear member (Step 207). The engagement may be such that the front end of the point 11 is pressed against a stop 69 of a gripper tool. Moving the handling apparatus 37 may include directing the movements of crane actuators and joint actuators to move concurrently the tool head with the wear member along the mounting axis at the same time in one solid motion. Determine whether the tool 59 has properly secured to the worn wear member (Step 209). For example, for a gripper tool, the arms attempt to grip the point 11 with flanges 63 fully on rear edges 64 of the point 11. If unsuccessful in securement to the wear member, a float mechanism is enabled (Step 211). In another example, the float mechanism may be automatic. Additionally, an alert 84 may be activated to indicated that a float mode has been initiated.

The float mechanism may be controlled by a host computer 43 with or without an operator (e.g. automated). The float mechanism may be initiated in a number of different ways, such as noted above. The float mechanism may be initiated several times before attachment to worn wear member. Such examples include floating one actuator attempting attachment, and if not successful, then floating the second actuator, and so on. The actuators may alternatively float simultaneously.

In the illustrated example of FIG. 13, the three-axis joint assembly 71A includes float mechanisms 81, 82 on actuators 34, 46, respectively. The float mode may allow for the control of axis A6, while axis A4 and/or A5 are in a float mode. In this example, movement along the removal/mounting path 31 may be better able to be achieved with small increments from actuators 34, 46. This step may include, for example, preparing a worn point 11 to be removed, such that a drive arm 65 is lowered so that tool 67 is received in recess 25 of the point 11 and rotated to move leading end 21 of pin 29 out of recess 20. This may further include sensor data confirming full pin extraction from the point 11 or from the adapter 10, 9. In another implementation, sensors may also aid in determining when the pin has been removed from the adapter 10, such that the point 11 may be removed without full extraction of the pin. In another implementation, sensors may aid in determining when the pin is fully installed into the adapter 10. Determination of the pin may be from GPS or accelerometers that either monitor for a predetermined distance the lock must travel to be fully engaged or fully removed or sensor data to compare to other locks already installed or removed on the earth working equipment. If successful in the attachment, then the worn wear member 7 is removed along the mounting axis 31 (Step 213). This may be done through manual control such that the handling apparatus including the crane 47 and joint assembly 71, 71A concurrently move about the mounting axis or through the computer processing system having instructions or logic for a programmed path of removal. The worn wear member 7 may be disposed of by placing the worn wear member 7 into a bin 75 on system 35.

The removal step 213 could optionally also include the release motions to better release it from its base before and/or during moving the wear member 7 along its mounting path 31. Examples of release motions could, for example, include short and/or rapid swinging of the wear member vertically and/or laterally to help release a stuck wear member (such as from the presence of impacted fines) from its base. Use of release motions could occur before or during pulling the wear member along its mounting path. Release motions could be programmed to automatically occur during each removal of a wear member and/or only if the force to remove the wear member exceeds a predetermined limit.

The process 200 may begin again by moving the gripper 60 to the next wear member 7 to be removed or may be followed by a process for installing a new replacement wear member where the worn one was removed. Also, process 200 may in a learn mode learn the path of operation by an operator manually moving the handling apparatus through a repeated course or steps in removing and installing a wear part. The process 200 may save those maneuvers and repeat them exactly or with the slight adjustment of moving over to the next worn member 7.

Figure 18:
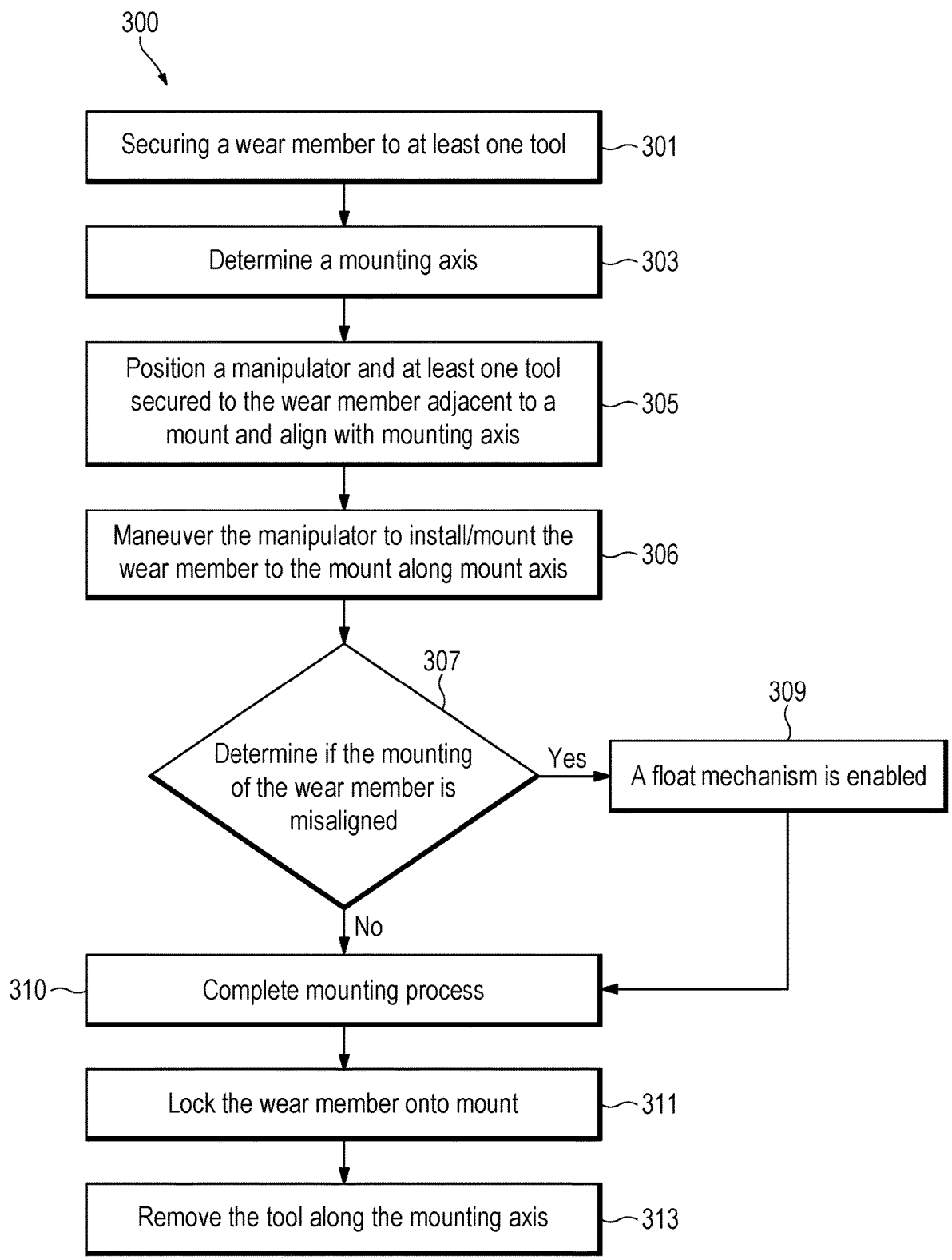
FIG. 18 is an example process of installing a wear component.

FIG. 18 illustrates one example method or process or program 300 for installing a new wear component 7A onto an earth working machine. Process 300 may be implemented in program instructions in the context of any of the software applications, modules, components, or other such programming elements deployed in a computer 43 or may be operator controlled through manual and/or semi-automated controls. The program instructions direct the underlying physical or virtual computing system or systems to operate as follows, referring parenthetically to the steps in FIG. 18. The various steps may be conducted in a different order and/or include more or less steps.

To begin, handling apparatus 37 secures to a replacement wear member 7A (e.g. point 11A) (Step 301). For example, this may be a gripper tool head that grips onto a wear member and removes the replacement wear member from a resting place. The resting place could be a carousel 77 or other similar holding places. The mounting path 31 is determined (Step 303). The path 31 could be determined by the computer 43 based on the removal process, by sensors 39 (such as those or others disclosed for the removal process), and/or manual (or semi-manual) control by an operator. For example, the operator may stop the apparatus 37 at a given point in a manipulator or crane mode, the stopping of the crane or manipulator sets the mounting axis 31, and then swapping controls to another mode, e.g. a mounting axis mode or "linear motion" mode, will move all components of system 35 along that set mounting axis 31 (e.g. in a linear path). The process 300 may further include storing the maneuvers and path 31 and the location where the worn wear member 7 was pulled from the mount (e.g. intermediate adapter 10) and can recall the stored information (without returning to the discard bin 75) from any previous movement to align the replacement wear member 7A with the mounting axis 31 for installation on the base or mount.

The next step includes maneuvering the handling apparatus 37 which may include the crane 47, joint assembly 71A, and a tool head secured to the wear member 7A (e.g. point 11A) adjacent to the mounting position (e.g. front nose 18 of intermediate adapter 10) on the earth working equipment and aligning with or setting the mounting path (Step 305). Once the replacement point 11A is aligned, the process 300 may maneuver the handling apparatus components (e.g. crane, joint assembly, tool head) concurrently, so that the point 11A moves forward in a straight-line or other defined motion along the mounting path 31 to mount or install the point 11A on the mount (e.g. intermediate adapter 10) (Step 306). Determine if the mounting of the point is misaligned (Step 307). This can be accomplished, for example, by reviewing the clearance for lock 13, because a lock must be positioned through the wear member 7 onto the mount (e.g. intermediate adapter 10). In one example, the lock 13 positioning may be aided by sensor data (e.g. from sensors in lock 13) that confirms the lock is in place or misaligned. If misaligned, for example, the lock 13 may not be aligned to lock into recess 19. If misaligned, enable a float mechanism (Step 309). Additionally, an alert 84 may optionally be activated to indicated that a float mode has been initiated.

The float mechanism may be initiated in a number of different ways such as noted previously. The float mechanism may be initiated several times before the replacement wear member is fully mounted. Such examples include floating one actuator attempting attachment, and if not successful, then floating the second actuator, and so on. Alternatively, the float may occur over two axes simultaneously.

The float mode may allow for the control of axis A6, while axis A4 and A5 are in a float mode. In this example, the mounting axis 31 may be better able to be achieved with small increments from actuators 34, 46. The float mechanism compensates for misalignment (e.g. relative positioning) of the mating parts. In one example, this is on account of the tight fits (e.g. small tolerances) that can exist between the point and mount, the point 11 must commonly be installed onto the base in a straight-line motion along the tooth's mounting axis 31. In another example of misalignment, the point 11 may cant during installation. In still another example, the deeper the mounting cavity 27 (such as for teeth 24 shown in FIGS. 4 and 5), the greater the need to install the point 11 along the straight-line mounting axis 31.

The mounting process is completed with replacement wear member 7A aligned on the mount and reading to receive a lock (Step 310). Once the mounting process is complete, the process 300 then locks the wear member 7A onto the mount (Step 311). This step may further include a driver 65 lowered such that a lock 13 is received in recess 19 of the wear member 7 and rotated to move the pin in the lock to the hold position. If successful in the mounting, then the wear member is removed along the mounting axis 31 (Step 313).

The process 300 may begin again by moving the gripper 60 to the next wear member 7 to be installed or may be followed by a process for removing a worn wear member where the replacement wear member is to be installed. Also, process 300 may in a learn mode to learn the path of operation by an operator manually moving the handling apparatus through a repeated course or steps in removing and installing a wear part. The process 300 may save those maneuvers and repeat them exactly or with the slight adjustment of moving over to the next mount for installation. The various steps of process 300 may be conducted in a different order and/or include more or less steps.

FIG. 19 is a schematic system diagram illustrating an example machine representing the systemization of the computing system or host computer 401 used to monitor one or more ground-engaging products or at least a portion thereof (e.g. the back or bottom side). Examples of computing system 401 include, but are not limited to, server computers, web servers, cloud computing platforms, and data center equipment, as well as any other type of physical or virtual server machine, container, and any variation or combination thereof. Computing system 401 may be implemented as a single apparatus, system, or device or may be implemented in a distributed manner as multiple apparatuses, systems, or devices. Information and/or data can be processed by processing system 402. The processing system 402 may be part of a standalone or monitoring system of the handling apparatus 37, the earth working equipment 1, the system 35, a handheld device, a mobile device, computer 43, sensors 39, 39A, 41, and/or a remote device(s).

The host computing system 401 includes, but is not limited to, processing system 402, storage system 403, software 405, communication interface system 407, and user interface system 409 (optional). Processing system 402 is operatively coupled with storage system 403, communication interface system 407, and user interface system 409.

Computing system 401 may employ central processing units (CPUs) or processors to process information. Processing system 402 may be implemented within a single processing device but may also be distributed across multiple processing devices or sub-systems that cooperate in executing program instructions. Examples of processing system 402 include programmable general-purpose central processing units, special-purpose microprocessors, programmable controllers, graphical processing units, embedded components, application specific processors, and programmable logic devices, as well as any other type of processing device, combinations, or variations thereof. Processing system 402 may facilitate communication between co-processor devices. The processing system 402 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing.

In one implementation, the processing system 402 or other elements of the system 401, may be operatively coupled with or be an Equipment Control Unit ECU. In another implementation, processing system 402 may expedite encryption and decryption of requests or data.

A processing system 402 may comprise a micro-processor and other circuitry that retrieves and executes computer instructions, programs, applications, and/or software 405 from storage system 403. Processing system 402 executes program components in response to user and/or system-generated requests. One or more of these program components may be implemented in software, hardware or both hardware and software 405. Processing system 402 may pass instructions (e.g., operational and data instructions) to enable various operations.

Communication interface system 407 may include communication connections and devices that allow for communication with other computing systems over communication networks. For example, communication interface system 407 may be in communication with a network.

Examples of connections and devices that together allow for inter-system communication may include network interface cards, antennas, power amplifiers, RF circuitry, transceivers, and other communication circuitry. Communication interface system 407 may use various wired and wireless connection protocols such as, direct connect, Ethernet, wireless connection such as IEEE 802.11a-x, miracast and the like. The connections and devices may communicate over communication media to exchange communications with other computing systems or networks of systems, such as metal, glass, air, or any other suitable communication media. The aforementioned media, connections, and devices are well known and need not be discussed at length here.

The communication interface system 407 can include a firewall which can, in some implementations, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. Other network security functions performed or included in the functions of the firewall, can be, for example, but are not limited to, intrusion-prevention, intrusion detection, nextgeneration firewall, personal firewall, etc., without deviating from the novel art of this disclosure.

User interface system 409 facilitate communication between user input devices, peripheral devices, and/or the like and components of computing system 401 using protocols such as those for handling audio, data, video interface, wireless transceivers, or the like (e.g., Bluetooth®, Bluetooth® Low Energy, IEEE 1394a-b, serial, universal serial bus (USB), Digital Visual Interface (DVI), 802.11a/b/g/n/x, cellular, etc.).

User input devices may include card readers, fingerprint readers, joysticks, keyboards, microphones, mouse, remote controls, retina readers, touch screens, sensors, and/or the like. Peripheral devices may include antenna, audio devices (e.g., microphone, speakers, etc.), cameras, external processors, displays, communication devices, radio frequency identifiers (RFIDs), scanners, printers, storage devices, transceivers, and/or the like. As an example, the user interface 409 may receive data and format data to be displayed on a display.

User input devices and peripheral devices may be connected to the user interface 409 and potentially other interfaces, buses and/or components. Further, user input devices, peripheral devices, co-processor devices, and the like, may be connected through the user interface system 409 to a system bus. The system bus may be connected to a number of interface adapters such as the processing system 402, the user interface system 409, the communication interface system 407, the storage system 405, and the like.

Storage systems 403 may employ any number of magnetic disk drive, an optical drive, solid state memory devices and other storage media. Storage system 403 may include volatile and nonvolatile, removable and non-removable media implemented in any method or technology for storage of information, such as computer readable instructions, data structures, program modules, or other data. Examples of storage media include tangible, non-transitory storage devices or systems such as fixed or removable random access memory (RAM), read only memory (ROM), magnetic disks, optical disks, flash memory, virtual memory and non-virtual memory, magnetic cassettes, magnetic tape, solid state memory devices, magnetic disk storage or other magnetic storage devices, or any other suitable processor-readable storage media. In no case is the computer readable storage media a propagated signal. The storage system 403 may employ various forms of memory including on-chip CPU memory (e.g., registers), RAM, ROM, and storage devices. Storage system 403 may be in communication with a number of storage devices such as, storage devices, databases, removable disc devices, and the like. The storage system 403 may use various connection protocols such as Serial Advanced Technology Attachment (SATA), IEEE 1394, Ethernet, Fiber, Universal Serial Bus (USB), and the like.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

The storage system 403 may be a database or database components that can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. Computer-executable instructions stored in the memory may include an interactive human machine interface or platform having one or more program modules such as routines, programs, objects, components, data structures, and so on that perform particular tasks or implement particular abstract data types. For example, the memory may contain operating system (OS), modules, processes, and other components, database tables, and the like. These modules/components may be stored and accessed from the storage devices, including from external storage devices accessible through an interface bus.

Software 405 (including movement process 411, removal process 413, mounting axis process 415, installation process 417, and float mode process 419) may be implemented in program instructions and among other functions may, when executed by processing system 402, direct processing system 402 to operate as described with respect to the various operational scenarios, sequences, and processes illustrated herein. For example, software 405 may include program instructions for implementing an installation and removal process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtualization software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to provide packet redirection. Indeed, encoding software 405 on storage system 403 may transform the physical structure of storage system 403. For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media.

Other transformations of physical media are possible without departing from the scope of the present description, with the foregoing examples provided only to facilitate the present discussion.

The movement process 411 includes instructions to control the handling apparatus 37. Some or all of the actions of handling apparatus 37 could be fully or partially automated. The movement process 411 may control the valves for the various hydraulic cylinders, actuators, and/or motors. The movement process 411 may include instructions for a processor or controller to be configured or manually direct the actions of the crane, 47, three-axis joint 71A and/or supported tool head(s) 59. The movement process 411 may have a processor with instructions configured to receive by another host computer, a handheld device, or a mobile device conducting a real-time operation—for example, operations of removal, installation, inspection, repair, etc.

In the movement process 411, the instructions for the automated operations are preferably pre-stored in a database (remote or in the adapter 6) and used to carry out the desired operations (e.g. process 413, 415, 417, and 419). In the movement process 411, the handling apparatus 37 and/or the three-axis joint assembly 71A and/or tool head(s) 59 can be provided with encoders (linear or rotary) and/or position sensors 41 at the actuators 34, 46, 56 to identify their positions and/or orientations. Automated and manual controls may work together cooperatively, successively or separately. Signals may alternatively or additionally be received from sensors 41 contained in the components and/or equipment to be removed, installed, inspected, etc. to, e.g., identify the component(s) and/or equipment, guide the crane 47, three-axis joint 71A and/or tool head(s) 59, or communicate other information about the position, condition or operation of the wear component 7 and/or equipment. Signals may be received from other three-axis joint assembly and/or tool head(s) working near or in cooperation with the crane, three-axis joint assembly 71A and/or tool head(s) 59. The process 411 allows the worker to avoid contact with the wear parts and remain at a safe distance from the parts during a handling operation.

The removal process 413 is used for removing a worn wear component 7 from an earth working machine 1. As the earth working machine may have been shut down in any given position, the removal process 413 must determine the orientation and the quantity of worn wear components. The removal process 413 may receive information generated from an electronic sensor 39, 39A, 41 that, e.g., captures data. The process 413 may receive information from such camera (or the like) and/or sensors, and/or sensors in the wear members or equipment supporting the wear members. As an example, the removal process 413 may receive information to identify the type of wear members 7 installed on the bucket, the position of the wear member 7 on the bucket 3, the orientation of the wear member 7, the condition of the wear member 7, etc.

For example, the sensor 39, 39A, 41 could detect the orientation of the wear member and/or the spatial position of the wear member, and wirelessly transmit a signal with the location information for use by the process 413 in determining the orientation and/or position of the wear member. As another example, an image sensor such as a camera(s), on or separate from handling apparatus 37, could be used by the process 413 to determine the specific 3-D orientation and/or position of the tooth 7 (e.g. point 11). Other kinds of sensors are possible and/or two or more of the different kinds of sensors could be used in combination with each other (e.g. a wear sensor in combination with a location sensor, inclination sensor, or accelerometer).

The removal process 413 could use a mounting axis process 415. The removal process 413 may provide information and analysis from received data from a sensor 39, 39A, 41, a database, other data sources, other remote device, etc. In the alternative, the mounting axis process may receive signals from the sensors 39, 39A, 41, in one example by wireless transmission (other arrangements are possible) containing data, such as the location of the mounting axis 31. The mounting axis process 415 may use the data collected from the sensors including the detected orientation of the worn wear component to determine the mounting axis 31. The mounting process 415 could optionally access a database with details of the points 11 and the mounting axes 31 to make the desired determination.

The removal process 413 may determine the appropriate tool head(s) 59 is selected and mounted to the manipulator 62. The removal process 415 may use the data from the mounting axis process 415 including the detected orientation of the mounting axis 31, the orientations of the worn wear member, and the relative positions of the crane 47 and joint components 71 to control hydraulic cylinders and motors to move the tool head 59 in a straight-line motion or non-linear motion along the mounting axis 31 regardless of the 3-D orientation of the mounting axis 31. The movement of the tool head 59 along the mounting path 31 may be a coordinated, simultaneous motion of the different adjustable components directed by the removal process 413. It could involve a coordinated movement of all the adjustable components, or it could involve adjustment of less than all the adjustable components. The wear member 7 is envisioned to be removed along the defined mounting path or axis 31. Other mounting paths are also possible. For example, certain wear members 7 (e.g., points and shrouds) may be removed and/or installed along a mounting path that is non-linear (e.g., arcuate).

Alternatively, the removal process 413 may manually adjust the manipulator 62 to place the tool head 59 in proximity or engagement with the wear member 7, such as pressing against a stop 69. Lasers (not shown) could be provided on the manipulator 62 to provide sighting lines, which could help the operator position the drive tool 67 into the lock 13. Cameras and/or sensors may be used in manual, automatic and/or semi-automatic operations. Cameras could be provided on (in addition to the lasers or on their own) to aid in the connection of the tool 59 to the wear parts. The use of cameras can also be used to assist the operator or fully automate the operation of the handling apparatus 37.

The front end of the point 11 is pressed against a stop 69 along the mounting axis 31. The removal process 413 may determine whether the tool head 59 has properly gripped the worn wear member 7. In the removal process 413, a lock 13 may be removed. In one example, the lock 13 positioning may be aided by sensor data (e.g. from sensors in lock 13) that confirms the lock is removed, removable, or misaligned. Determination of the pin of the lock 13 may be from GPS or accelerometers that either monitor for a predetermined distance the lock must travel to be partially or fully removed or sensor data to compare to other locks already installed on or removed from the earth working equipment. In the removal process 413, the arms 61 of a gripper 60 attempt to grip the point 11 with flanges 63 on rear edges 64 of the point 11. If unsuccessful, the removal process 413 may call to a float mode process 419. The float mode process 419 puts actuators 34, 46, 56 into a neutral state such that the valve pressure is counterbalanced back and forth, and the actuators move in smaller increments in each direction of the axes A4 and/or A5.

The float mode process 419 may initiate in a number of different ways such as discussed above. The float mode process 419 may be initiated several times in different manners as explained above before achieving attachment to worn wear member. The removal process 413 could optionally also include the release motions as discussed above to better release it from its base before and/or during moving the wear member 7 along its removal/mounting path 31.

The removal process 413 may further include preparing a worn wear member 7 to be removed, such that a drive arm 65 is lowered such that tool 67 is received in recess 45 of the wear member 7 and rotated to move leading end 21 of pin 29 out of recess 19. Once unlocked, then the worn wear member 7 is removed along the mounting axis 31. The removal process 413 may dispose of the worn wear member 7 by placing the worn point 11 into a bin 75. The process 413 may begin again by moving the gripper 60 to the next worn wear member 7 to be removed. Also, process 413 may learn in a learn mode the path of operation by an operator manually moving the handling apparatus through repeated sessions. The process 413 may save those maneuvers and repeat them exactly or with the slight adjust of moving over to the next worn wear member 7.

The installation process 417 is used for installing a new wear component 7A onto the earth working machine 1. The installation process 417 attaches to a replacement wear component 7A, such as point 11A from a pre-set destination, such as a carousel 77 or similar holding place. The location of the replacement point 11A may be determined by sensors on the replacement point 11A or from the location being programmed into the process 417. The installation process 417 uses the mounting axis process 415 as described above. The mounting axis 31 could be determined based on the finer details of the removal process 413, by sensors 39 (such as those or others disclosed for the removal process), and/or manual (or semi-manual) control. The installation process 417 may further include storing the maneuvers and path 31 and the location where the worn wear member 7 was pulled from the mount and can recall the stored information from any previous iteration of movement to align the replacement wear member 7A with the mounting axis 31 for installation on the base 9, nose 10, lip 16, or other mounting site by reversing those maneuvers.

Once the replacement point 11A is aligned along the mounting axis 31, the installation process 415 may move the point 11A forward in a straight-line or other defined motion along the mounting axis or other mounting path 31 to mount the point 11A on the mount (e.g. front nose 18 of the intermediate adapter 10). The installation process 415 may determine if the mounting of the point 11 is misaligned. This can be accomplished, for example, by reviewing the clearance for lock 13, because a lock must be positioned through the wear member 7 onto the mount (e.g. front nose 18 of the intermediate adapter 10). Alternatively, this could be accomplished by visual check through image data of a camera. In another example, the lock 13 positioning may be aided by sensor data (e.g. from sensors in lock 13) that confirms the lock is in place or misaligned. Determination of the pin of the lock may be from GPS or accelerometers that either monitor for a predetermined distance the lock must travel to be fully engaged or fully removed or sensor data to compare to other locks already installed or removed on the earth working equipment. If misaligned, the installation process may enable a float mode process 419 as explained above.

The float mode process 419 compensates for misalignment (e.g. relative positioning) of the mating parts. In one example, this is on account of the tight fits (e.g. small tolerances) that can exist between the point and mount, the point 11 must commonly be installed onto the intermediate adapter 10 or base adapter 9 in a straight-line motion or non-linear motion along the tooth's mounting axis 31. In another example of misalignment, the point 11 may cant during installation. In still another example, the deeper the mounting cavity 27 (such as for teeth 24 shown in FIGS. 4 and 5), the greater the need to install the point 11 along the mounting axis 31.

The installation process 419 then locks the wear member 7A onto the base adapter 9, intermediate adapter 10, or mounting site once alignment is completed in the float mode process 419. The installation process may include a drive arm 65 to install a lock. In one example, the drive arm is lowered such that a lock 13 is received in recess 19 of the wear member 7 and rotated to lock. If successful in the mounting, then the tool 59 is removed from the replacement wear member 7A.

As can be appreciated, examples of the present disclosure may be embodied as a system, method or computer program product. Accordingly, examples of the present disclosure may take the form of an entirely hardware example, an entirely software example (including firmware, resident software, micro-code, etc.) or an example combining software and hardware implementations that may all generally be referred to herein as a "circuit," "module" or "system." Furthermore, implementations of the present disclosure may take the form of a computer program product embodied in one or more computer readable medium(s) having computer readable program code embodied thereon.

Although the above discussion has discussed the disclosure primarily in connection with a wear member on a bucket, the tool can be used to remove and install shrouds, wings, and/or runners on chutes, picks on crushers, pipes, valves, truck trays, end bits from and/or on blades or other earth working equipment attachments and components.

The above disclosure describes specific examples for a tool for installing and removing wear products for earth working equipment. The system includes may include different implementations or features of the disclosure. The features in one example can be used with features of another example. The examples given and the combination of features disclosed are not intended to be limiting in the sense that they must be used together. The steps of the methods and processes may be done in any order and may include fewer or more steps.

The invention claimed is:

1. A process for removing and/or installing a ground-engaging wear member from and/or onto a mount on a bucket for an earth working equipment comprising:
   holding the ground-engaging wear member by a tool;
   maneuvering a manipulator and the tool secured to the manipulator to remove and/or install the wear member from and/or onto the mount, wherein the manipulator includes (i) a crane with at least two crane components movable relative to each other with at least two degrees of freedom and crane hydraulic actuators to move the crane components relative to each other, and (ii) a joint with a base to secure the joint to the crane, a tool mount to secure the tool holding the ground-engaging wear member to the joint, joint components movably joined together in close proximity with each other between the base and the tool mount to define three axes of articulation, and joint hydraulic actuators to move the joint components relative to each other;
using a processing system including a host computer to determine a path for the ground-engaging wear member to be removed from and/or onto the mount using input from at least one sensor and to operate the crane hydraulic actuators and/or the joint hydraulic actuators to move the wear member along the path to remove and/or install the ground-engaging wear member from and/or onto the mount, and to selectively initiate a float mechanism coupled to the joint hydraulic actuators to allow for small adjustments of least one of the joint components from external forces applied to the wear member by the mount as the wear member is moved along the path to remove and/or install the wear member from and/or onto the mount by at least one other crane and/or joint hydraulic actuators with or without operator input.

2. A process for removing and/or installing a ground-engaging wear member from and/or onto a mount on a bucket for an earth working equipment, the process comprising:
holding the ground-engaging wear member by to a tool secured to a manipulator;
maneuvering the manipulator and the tool to remove and/or install the wear member from and/or onto the mount wherein the manipulator includes at least three hydraulic actuators for movement about three axes;
using a processing system with input from at least one sensor to determine a path for the ground-engaging wear member to be removed from and/or onto the mount; and
selectively activating a float mechanism to simultaneously float two hydraulic actuators associated with moving the manipulator about a first and second of the axes such that the wear member is moved in the first and second of the axes by an external force caused by the engagement of the ground-engaging wear member with the mount while removing and/or installing the ground-engaging wear member from and/or onto the mount.

3. A wear member handling system for removing a ground-engaging wear member from a bucket of an earth working equipment, the wear member handling system comprising:
a crane with crane components movably joined together with at least two degrees of freedom and crane hydraulic actuators to selectively hold and move the crane components in various positions relative to each other;
at least one tool for selectively holding the wear member;
a joint including a base to secure the joint to the crane, a tool mount to secure the at least one tool to the joint, joint components movably joined together between the base and the tool mount to provide movement about at least three axes, and joint hydraulic actuators to selectively move and hold the joint components in various positions relative to each other, the joint hydraulic actuators each having opposites sides for receiving fluid;
at least one sensor to detect the positions of the crane components and the joint components;
a processing system configured to determine a path from locations detected by the at least one sensor for removing the wear member from the mount, and directing the movements of the crane hydraulic actuators and or the joint hydraulic actuators to move the wear member along the path;
at least one float control manifold to selectively direct fluid within two of the joint hydraulic actuators simultaneously to allow for small adjustments of two of the joint components about two of the axes from external forces applied to the wear member by the mount while the wear member is moved along the path to remove the wear member from the mount.

4. A wear member handling system for removing and/or installing a ground-engaging wear member from and/or onto a mount of a bucket on an earth working equipment, the wear member handling system comprising:
a manipulator supporting the wear member and including hydraulic actuators to adjust the manipulator and thereby move the wear member;
a processing system including a host computer to determine a path for removing the wear member from the mount and/or installing the wear member onto the mount, and direct the movements of the hydraulic actuators to move the wear member along the path; and
a float mechanism to direct a flow of a fluid within at least one of the hydraulic actuators to allow for small adjustments along one or two axes from external forces as the wear member is moved along the path while the processing system is directing the movements of at least one other hydraulic actuator of the manipulator along the path, wherein the host computer selectively initiates the float mechanism to direct the flow of the fluid within at least one of the hydraulic actuators with or without operator input.

5. The wear member handling system of claim 4, wherein the float mechanism includes a motor and a barrier, the barrier having two positions, in a closed position, the barrier blocks a pathway between two fluid inlets of a hydraulic actuator, and in a float position, the barrier opens the pathway between the two fluid inlets of the hydraulic actuator, and wherein the motor controls the position of the barrier.

6. The wear member handling system of claim 4 including a controller with at least one manually-activated control to signal which direction the wear member should be moved when held by the tool, wherein the processing system moves the crane actuators and/or the joint actuators to remove and/or install the wear member from and/or onto the mount in response to the signal.

7. A wear member handling system for removing a ground-engaging wear member from a bucket of an earth working equipment, the wear member handling system comprising:
a crane with crane components movably joined together with at least two degrees of freedom and hydraulic crane actuators to selectively hold and move the crane components in various positions relative to each other;
a tool head including a gripper for selectively holding the wear member;
a joint including a base to secure the joint to the crane, a tool mount to secure the tool head to the joint, joint components movably joined together between the base and the tool mount about three axes, and hydraulic joint actuators to selectively move and hold the joint components in various positions relative to each other;
a manually-activated controller to operate the crane, the joint and/or the grippers to grip and hold the wear member;
a sensor module mounted in series with the tool head to detect the applied pulling force to remove the wear member when the wear member is gripped by the grippers;

a processing system to determine a path for removing the wear member from the mount, directing the movements of the crane actuators and the joint actuators when activated by the controller to move the wear member along the path; and a float mechanism to selectively direct a flow of a fluid within at least one of the hydraulic actuators to allow for small adjustments along one or two axes from external forces as the wear member is moved along the path.

8. The wear member handling system of claim 7 including crane sensors on the crane and joint sensors on the joint to detect the relative positions of the crane components relative to each other and the joint components relative to each other, wherein the processing system communicates with the crane sensors and the joint sensors to determine the path and direct the movements of the crane and the joint concurrently.

9. The wear member handling system of claim 7, including an optical sensor, wherein the path is determined by vision recognition software mapping a three-dimensional orientation of the tooth.

10. The wear member handling system of claim 7 wherein the path is along a straight-line axis.

11. The wear member handling system of claim 7 wherein the path is along a discrete non-linear course.

12. The wear member handling system of claim 7 wherein the crane components include at least two arms pivotally coupled together for movement about spaced apart, parallel first axes.

13. The wear member handling system of claim 12 wherein the at least two arms are movable about a second axis perpendicular to the first axes.

14. The wear member handling system of claim 13 wherein the three axes in the joint includes a pitch axis, a yaw axis and a roll axis for maneuvering the tool head holding the wear member.

15. The wear member handling system of claim 14 wherein the crane is supported by a movable base to permit transport to the location of the earth working equipment.

16. The wear member handling system of claim 15 wherein the manually-activated controller has a first mode that causes the movement of only the crane components, a second mode that causes the movement of only the joint components, and a third mode that causes concurrent movement of both the crane components and the joint components.

\* \* \* \* \*